US009893784B2

(12) United States Patent
Lee

(10) Patent No.: US 9,893,784 B2
(45) Date of Patent: Feb. 13, 2018

(54) LTF DESIGN FOR WLAN SYSTEM

(71) Applicant: NEWRACOM, INC., Irvine, CA (US)

(72) Inventor: Daewon Lee, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 0 days.

(21) Appl. No.: 14/756,914

(22) Filed: Oct. 28, 2015

(65) Prior Publication Data

US 2016/0119047 A1 Apr. 28, 2016

Related U.S. Application Data

(60) Provisional application No. 62/069,665, filed on Oct. 28, 2014, provisional application No. 62/214,823, filed on Sep. 4, 2015.

(51) Int. Cl.
| | |
|---|---|
| *H04B 7/06* | (2006.01) |
| *H04L 5/00* | (2006.01) |
| *H04L 27/26* | (2006.01) |
| *H04W 48/16* | (2009.01) |

(52) U.S. Cl.
CPC ......... *H04B 7/0617* (2013.01); *H04L 5/0048* (2013.01); *H04L 27/2613* (2013.01); *H04W 48/16* (2013.01)

(58) Field of Classification Search
None
See application file for complete search history.

(56) References Cited

U.S. PATENT DOCUMENTS

| 6,353,636 | B1 * | 3/2002 | Tate ................... H04L 27/2679 375/260 |
|---|---|---|---|
| 6,577,650 | B1 * | 6/2003 | Tate ...................... H04L 5/0048 370/509 |
| 7,317,750 | B2 * | 1/2008 | Shattil ............... H04L 25/03834 375/146 |
| 7,406,261 | B2 * | 7/2008 | Shattil .................... H04L 27/00 398/182 |

(Continued)

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.

(Continued)

*Primary Examiner* — Mounir Moutaouakil
(74) *Attorney, Agent, or Firm* — McDermott Will & Emery LLP

(57) ABSTRACT

In an example of wireless multi-user communication, a station may generate a frame and provide the frame for transmission to multiple stations. The frame may include a long training field (LTF) portion and a data portion. The LTF portion and the data portion may be associated with a plurality of tones. Each group of the plurality of tones in the data portion may be associated with a respective steering matrix. Each group of the plurality of tones in the data portion may include two or more tones of the plurality of tones. One or more of the multiple stations may receive the frame and process the frame. Other methods, apparatus, and computer-readable media are also disclosed.

18 Claims, 15 Drawing Sheets

(56) References Cited

U.S. PATENT DOCUMENTS

| | | | | |
|---|---|---|---|---|
| 7,957,474 B2* | 6/2011 | Waters | ............... | H04L 27/0012 |
| | | | | 375/260 |
| 8,917,784 B2* | 12/2014 | Yang | ................... | H04L 27/2613 |
| | | | | 370/334 |
| 9,119,186 B2* | 8/2015 | Zhang | ..................... | H04L 5/001 |
| 9,203,683 B2* | 12/2015 | Zhang | ..................... | H04L 29/02 |
| 9,553,699 B2* | 1/2017 | Yu | .............................. | H04L 5/00 |
| 2006/0274852 A1* | 12/2006 | Trachewsky | .......... | H04L 1/0002 |
| | | | | 375/295 |
| 2011/0299382 A1* | 12/2011 | Van Nee | ............. | H04L 27/2613 |
| | | | | 370/210 |
| 2012/0195391 A1* | 8/2012 | Zhang | .................. | H04L 5/0048 |
| | | | | 375/295 |
| 2012/0300874 A1* | 11/2012 | Zhang | .................. | H04L 5/0048 |
| | | | | 375/295 |
| 2013/0182662 A1* | 7/2013 | Zhang | ..................... | H04L 29/02 |
| | | | | 370/329 |
| 2013/0315163 A1* | 11/2013 | Zhang | ..................... | H04L 5/001 |
| | | | | 370/329 |
| 2014/0307649 A1* | 10/2014 | Vermani | ............... | H04L 5/0044 |
| | | | | 370/329 |
| 2014/0328242 A1* | 11/2014 | Tong | .................... | H04W 48/00 |
| | | | | 370/312 |
| 2015/0326408 A1* | 11/2015 | Vermani | ............... | H04L 1/0625 |
| | | | | 370/328 |
| 2015/0372848 A1* | 12/2015 | Vermani | ............... | H04L 1/0625 |
| | | | | 370/328 |
| 2016/0037441 A1* | 2/2016 | Li | ......................... | H04L 1/0001 |
| | | | | 370/338 |
| 2016/0100396 A1* | 4/2016 | Seok | ....................... | H04L 5/003 |
| | | | | 370/329 |
| 2016/0119171 A1* | 4/2016 | Suh | ..................... | H04L 27/2613 |
| | | | | 370/338 |
| 2016/0366548 A1* | 12/2016 | Wang | .................... | H04W 64/00 |
| 2017/0215104 A1* | 7/2017 | Zhang | ................. | H04W 28/065 |

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

* cited by examiner

HE PPDU Format

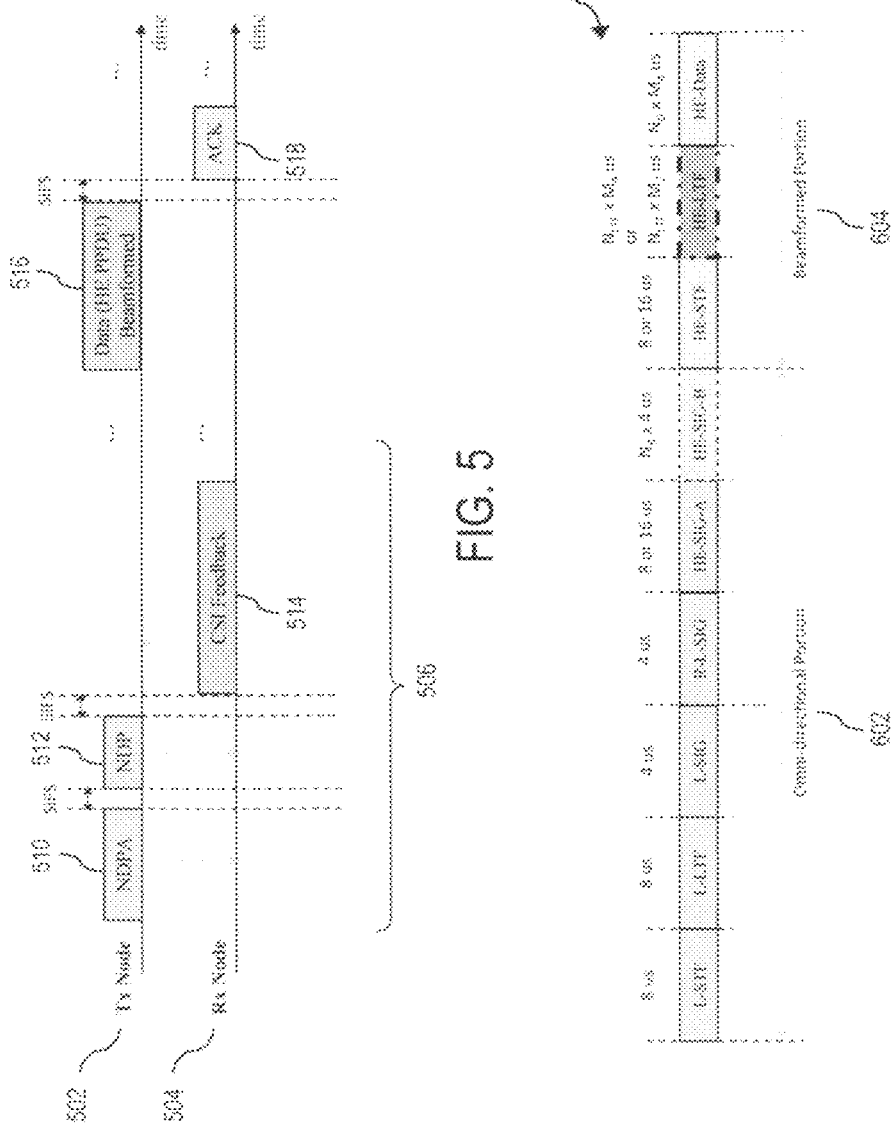

LTF DESIGN FOR WLAN SYSTEM

CROSS-REFERENCE TO RELATED APPLICATIONS

This application claims the benefit of priority from U.S. Provisional Application No. 62/069,665, entitled "PILOT SYMBOL DESIGN FOR WIRELESS LOCAL AREA NETWORK (WLAN) SYSTEM," filed Oct. 28, 2014, and U.S. Provisional Application No. 62/214,823, entitled "PILOT SYMBOL DESIGN FOR WIRELESS LOCAL AREA NETWORK (WLAN) SYSTEM," filed Sep. 4, 2015, all of which are incorporated herein by reference in their entirety.

TECHNICAL FIELD

The present description relates in general to wireless communication systems and methods, and more particularly to, for example, without limitation, long training field (LTF) design for wireless local area network (WLAN) system.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

BRIEF DESCRIPTION OF THE DRAWINGS

FIG. 5 illustrates an example of a beamforming procedure between a transmitter node and a receiver node.

FIG. 6 illustrates an example of an HE frame.

FIG. 19 illustrates an example of a PPDU format.

FIG. 20 illustrates an example of a PPDU format.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Transmissions associated with the Institute of Electrical and Electronics Engineers (IEEE) 802.11, Task Group ax, may be referred to as high efficiency (HE) based transmissions. Beamforming, which may also be referred to as steering or pre-coding, may be utilized in HE transmissions. A beamforming matrix applied to an HE transmission allows energy associated with the HE-based transmission to be focused along a direction in accordance with the beamforming matrix. The focusing of energy may facilitate an increase in gain between a transmitter of a beamformed packet and a receiver of the beamformed packet. Physical layer convergence procedure (PLCP) protocol data unit (PPDU) formats are provided for HE-based transmission.

In one or more implementations, groups of subcarriers may utilize the same beamforming matrix. The groups of subcarriers may include subcarriers associated with the usable subcarriers within a channel bandwidth. The subcarriers may be consecutive subcarriers. The grouping of the subcarriers may facilitate a channel estimation procedure. A subcarrier may also be referred to as a tone. Each tone may be associated with or otherwise identified by a tone index or a subcarrier index. A tone index may be referred to as a subcarrier index.

Figure 1:
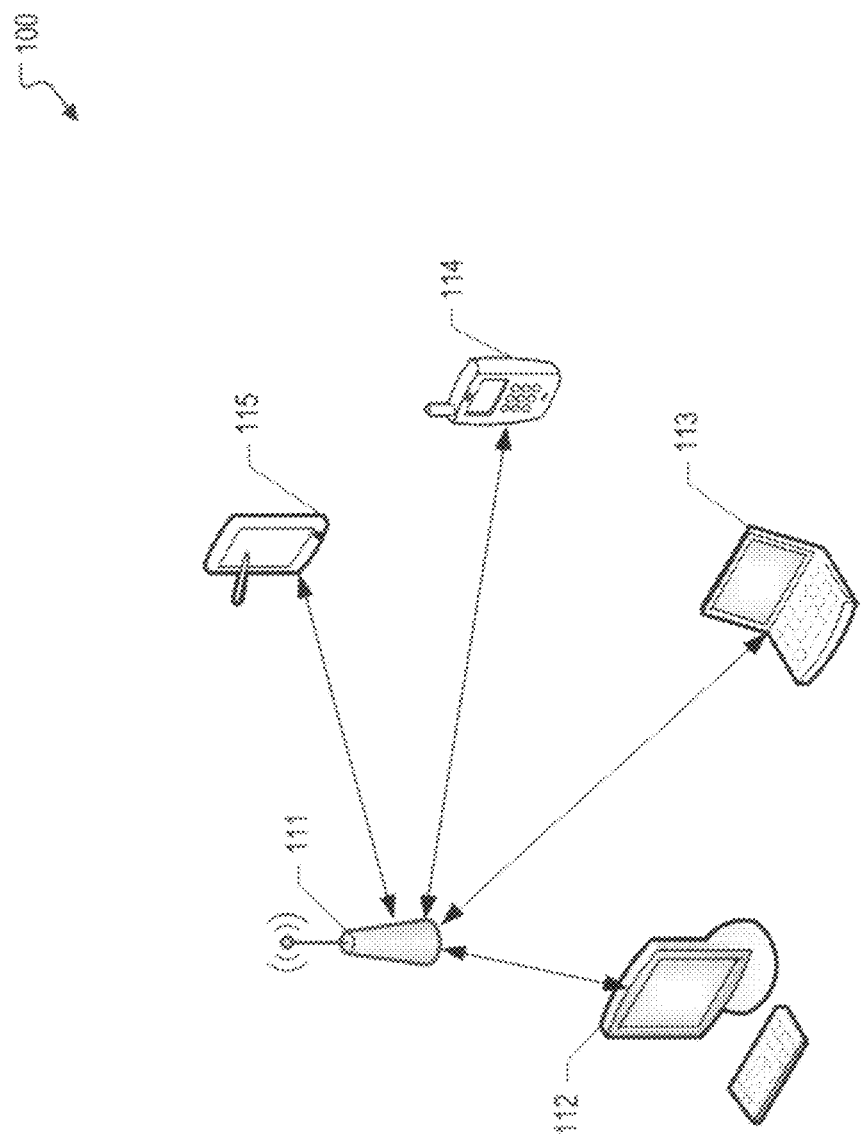
FIG. 1 illustrates a schematic diagram of an example of a wireless communication network.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a media access control (MAC) layer and a physical (PHY) layer according to an IEEE 802.11 standard. In the example, at least one wireless communication device (e.g., device 111) is an access point (AP). An AP may be referred to as an AP STA or an AP device. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. An non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, orthogonal frequency division multiple access (OFDMA)-based 802.11 technologies are utilized, and for the sake of brevity, a STA refers to a non-AP high efficiency (HE) STA, and an AP refers to an HE AP. In one or more aspects, a STA may act as an AP.

Figure 2:
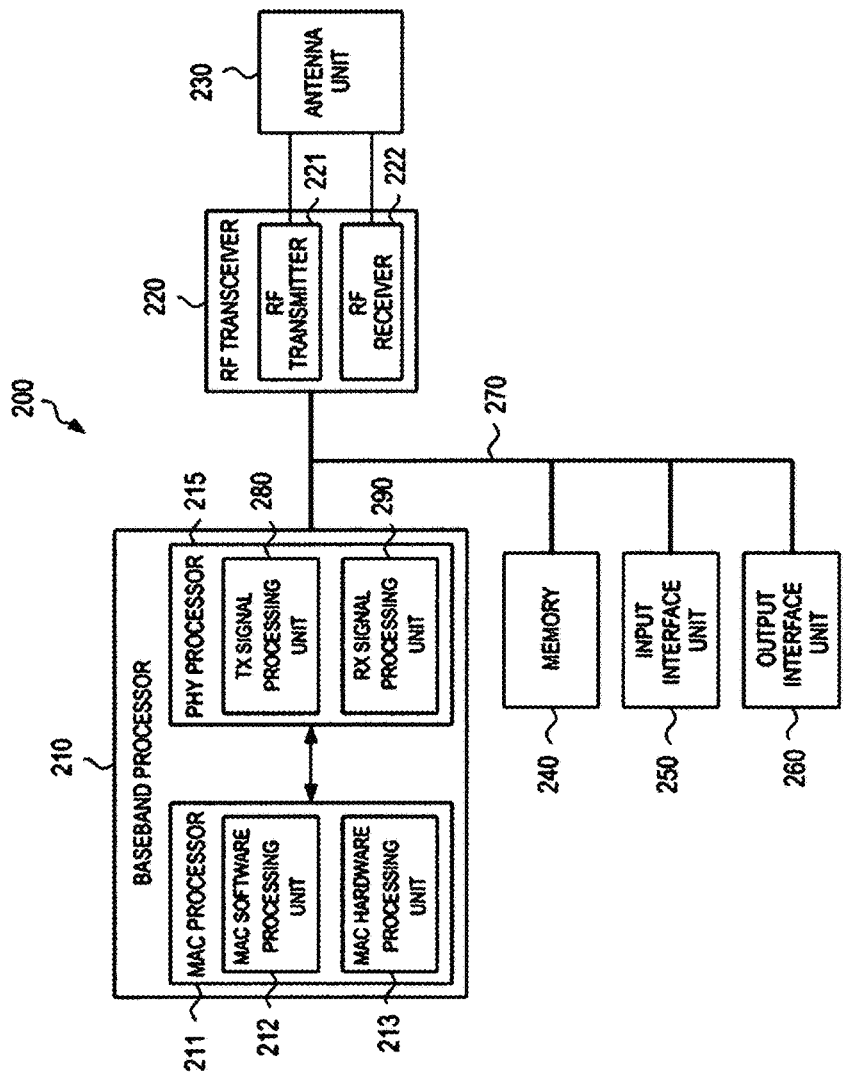
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

Figure 3:
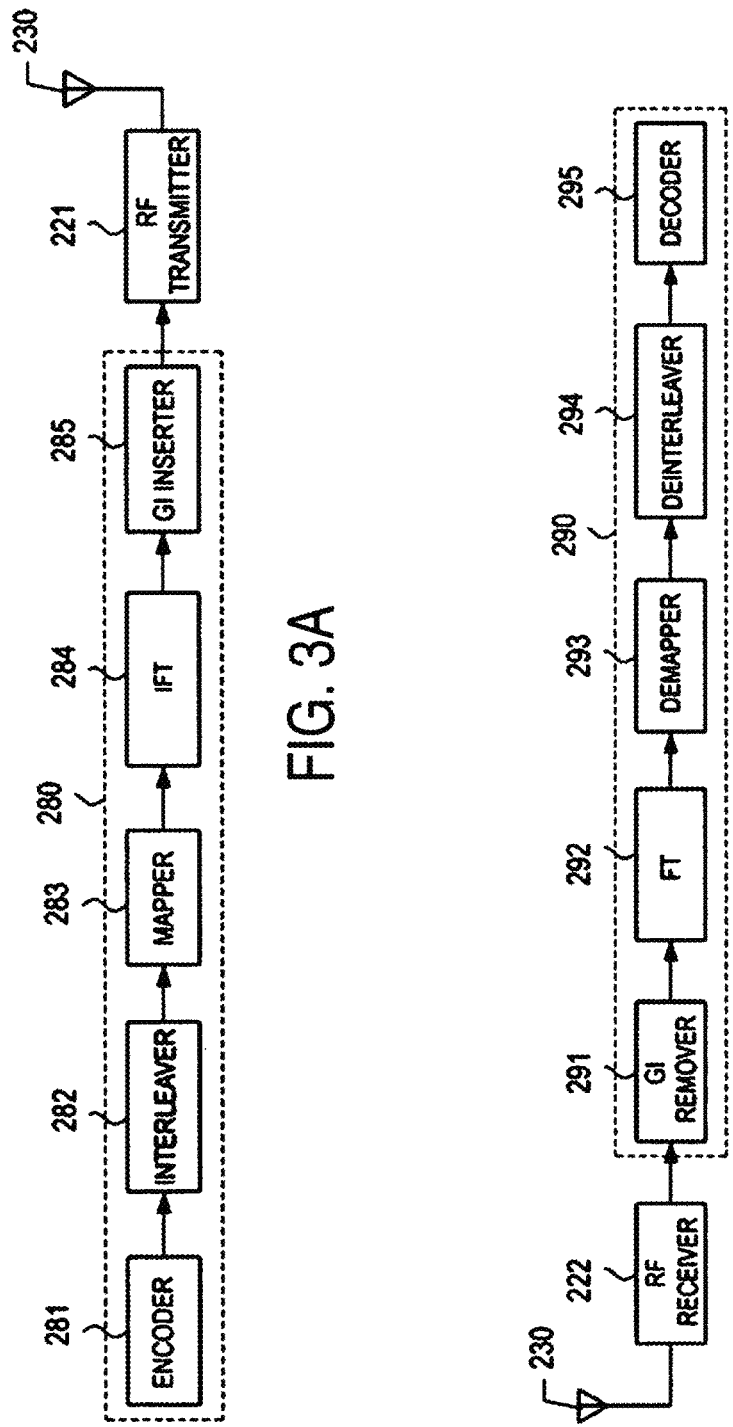
FIG. 3A illustrates a schematic block diagram of an example of a transmitting signal processor in a wireless communication device.
FIG. 3B illustrates a schematic block diagram of an example of a receiving signal processor in a wireless communication device.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams ($N_{SS}$). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may be a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC encoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

Figure 4:
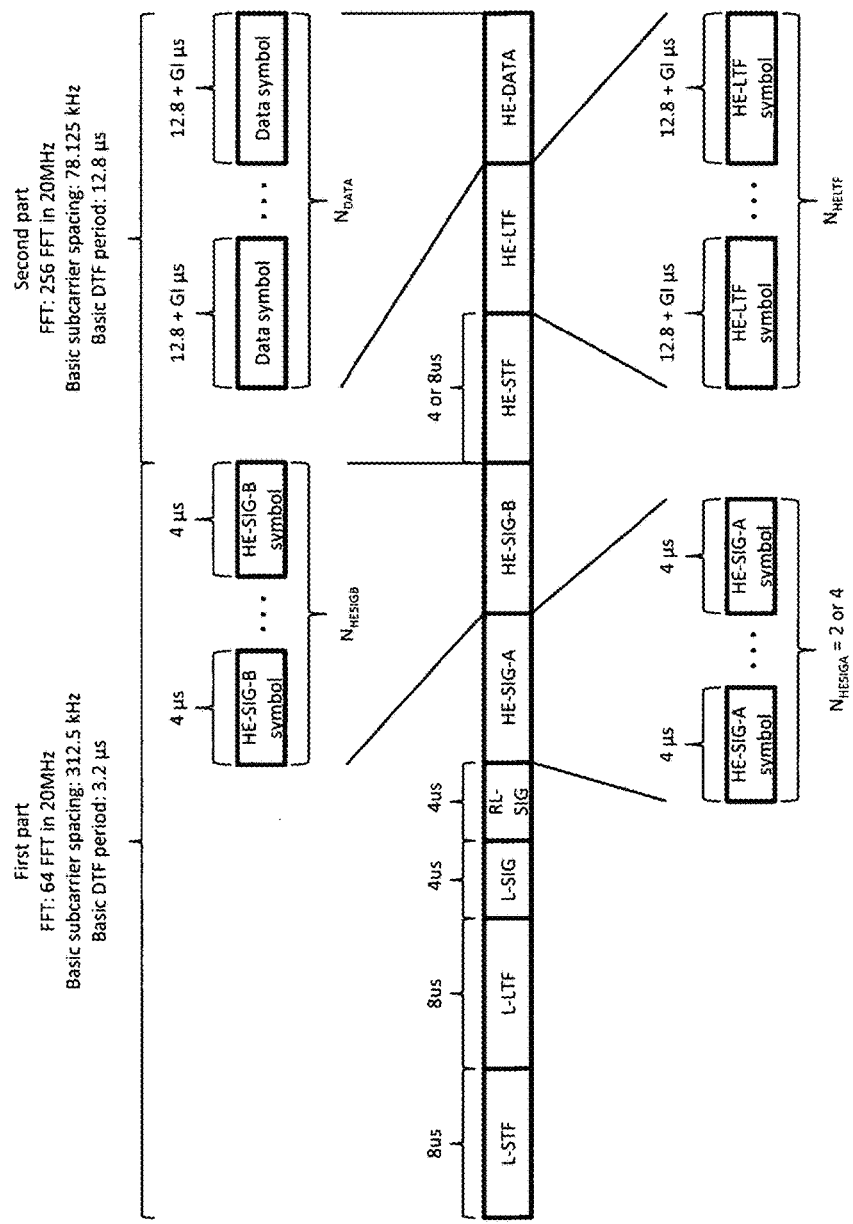
FIG. 4 illustrates an example of a high efficiency (HE) frame.

FIG. 4 illustrates an example of a high efficiency (HE) frame 400. The HE frame 400 is a physical layer convergence procedure (PLCP) protocol data unit (or PPDU) format. An HE frame may be referred to as an OFDMA frame, a PPDU, a PPDU format, an OFDMA PPDU, an MU PPDU, another similar term, or vice versa. An HE frame may be simply referred to as a frame for convenience. In one or more implementations, an AP may transmit a frame for downlink (DL) using a frame format shown in this figure or a variation thereof (e.g., without any or some portions of an HE header). A STA may transmit a frame for uplink (UL) using a frame format shown in this figure or a variation thereof (e.g., without any or some portions of an HE header). As used herein, "us" and "µs" are used interchangeably and refer to a microsecond ($10^{-6}$ second).

Referring to FIG. 4, the HE frame 400 contains a header and a data field. The header includes a legacy header comprised of a legacy short training field (L-STF), a legacy long training field (L-LTF), and a legacy signal (L-SIG) field. These legacy fields contain symbols based on an early design of an IEEE 802.11 specification. The L-STF, L-LTF, and L-SIG fields may be 8 µs, 8 µs, and 4 µs, respectively. Presence of these symbols would make any new design compatible with the legacy designs and products. The legacy header may be referred to as a legacy preamble. In one or more aspects, the term header may be referred to as a preamble.

In one or more implementations, the legacy STF, LTF, and SIG symbols are modulated/carried with FFT size of 64 on a 20 MHz sub-channel and are duplicated every 20 MHz if the frame has a channel bandwidth wider than 20 MHz. Therefore, the legacy field (i.e., the STF, LTF, and SIG fields) occupies the entire channel bandwidth of the frame. The L-STF field may be utilized for packet detection, automatic gain control (AGC), and coarse frequency-offset (FO) correction. In one aspect, the L-STF field does not utilize frequency domain processing (e.g., FFT processing) but rather utilizes time domain processing. Thus, in one aspect, the L-STF field is not affected by the channel dispersion. The L-LTF field may be utilized for channel estimation, fine frequency-offset correction, and symbol timing. The L-SIG field includes one orthogonal frequency division multiplexing (OFDM) symbol. Thus, in one aspect, the term L-SIG field may be used interchangeably with L-SIG symbol. In one or more aspects, the L-SIG field may contain information indicative of a data rate and a length (e.g., in bytes) associated with the HE frame 400, which may be utilized by a receiver of the HE frame 400 to calculate a time duration of a transmission of the HE frame 400.

The header may also include an HE header comprised of an HE-SIG-A field and an HE-SIG-B field. The HE-SIG-A field may sometimes be referred to simply as a SIG-A field. These fields contain symbols that carry control information that may be vital regarding each PLCP service data unit (PSDU) and regarding the radio frequency (RF), PHY, and MAC properties of a PPDU. Several sub-fields may be located either in the HE-SIG-A and/or HE-SIG-B fields. In one aspect, the HE-SIG-A field can be carried/modulated using an FFT size of 64. The HE-SIG-B field can be carried/modulated using an FFT size of e.g., 64 or 256 depending on implementation. The HE-SIG-A and HE-SIG-B fields may occupy the entire channel bandwidth of the frame. In some aspects, the size of the HE-SIG-A field and/or the HE-SIG-B field is variable. In other words, the number of symbols contained in the HE-SIG-A field and/or HE-SIG-B field can vary from frame to frame. For example, the number of symbols in the HE-SIG-A field (represented as $N_{HESIGA}$) may be two symbols, four symbols, among other possibilities. The number of symbols in the HE-SIG-B field (represented as $N_{HESIGB}$) may be one symbol, two symbols, zero symbols, among other possibilities. In this regard, an HE-SIG-B field is not always present in all frames. In some cases, single user (SU) packets and UL trigger-based packets do not contain the HE-SIG-B field. To facilitate decoding of the HE frame 400 by a receiver, the size of (e.g., number of symbols contained in) the HE-SIG-B field may be indicated in the HE-SIG-A field. Each of $N_{HESIGA}$ and $N_{HESIGB}$ symbols may be 4 µs including a guard interval (e.g., 0.8 µs guard interval).

For a 20 MHz channel, an FFT size of 64 is associated with a discrete Fourier transform (DFT) period of 3.2 µs and a subcarrier spacing of 312.5 kHz. For a 20 MHz channel, an FFT size of 256 is associated with a DFT period of 12.8 µs and a subcarrier spacing of 78.125 kHz. The DFT period may also be referred to as an inverse DFT period (IDFT) or an IDFT/DFT period. The DFT period may be denoted as $T_{DFT}$. The subcarrier spacing may be referred to as a subcarrier frequency spacing and may be denoted as $\Delta_F$. The DFT period may be obtained by dividing the channel bandwidth by the FFT size. The subcarrier spacing is the reciprocal of the DFT period.

The HE header may further include HE-STF and HE-LTF fields, which contain symbols used to perform necessary RF and PHY processing for each PSDU and/or for the whole PPDU. The HE-LTF symbols may be modulated/carried with an FFT size of 256 and modulated over the entire bandwidth of the frame. Thus, the HE-LTF field may occupy the entire channel bandwidth of the frame. The HE-STF symbols may have a fixed pattern and a fixed duration. For example, the HE-STF symbols may have a predetermined repeating pattern. In one aspect, the HE-STF symbols do not require FFT processing. The HE frame 400 may include the data field, represented as HE-DATA, that contains data symbols. The data field may also be referred to as a payload field, data, or payload.

A first part of the HE frame 400 may include the legacy STF, LTF and SIG symbols and the HE-SIG-A and HE-SIG-B symbols. A second part of the HE frame 400 may include HE-STF, HE-LTF, and HE-DATA symbols. In one example, a first part of the HE frame 400 may include those symbols that are modulated/carried with an FFT size of 64 on a 20 MHz channel (e.g., using a DFT period of 3.2 μs and a subcarrier spacing of 312.5 kHz), whereas a second part of the HE frame 400 may include those symbols that are modulated/carried with an FFT size of 256 on a 20 MHz channel (e.g., using a DFT period of 12.8 μs and a subcarrier spacing of 78.125 kHz). The L-STF and HE-STF symbols may be known predetermined patterns that do not require FFT processing. Thus, although depicted as being a component of the first part or the second part of the HE frame 400, the L-STF and HE-STF symbols may be considered separate from the first part and the second part of the HE frame 400. In some aspects, an HE-STF symbol may be 4 μs, 8 μs, or 16 μs.

In one or more aspects, the first part of the HE frame 400 is associated with a first FFT size, and the second part 422 of the HE frame 400 is associated with a second FFT size that is greater (or larger) than the first FFT size. In one or more aspects, the first part of the HE frame 400 is associated with a first subcarrier spacing (e.g., 312.5 kHz), and the second part of the HE frame 400 is associated with a second subcarrier spacing (e.g., 78.125 kHz) that is less than the first subcarrier spacing. In one aspect, a subcarrier spacing is a spacing between tones (or between subcarriers). In one or more aspects, the boundary of a first part and a second part of an HE frame 400 can be placed at a location other than the location shown in FIG. 4. For example, the first part may start at the beginning of the L-LTF field and end at the end of the HE-SIG-B field (or HE-SIG-A field when there is no HE-SIG-B field). The second part may start at the beginning of the HE-LTF field.

In one or more aspects, additional one or more of the HE-STF and/or HE-LTF fields may be included in the header. For example, an additional HE-STF field and/or an additional HE-LTF field may be included between the HE-SIG-A field and the HE-SIG-B field. The additional HE-STF and HE-LTF fields may be, for example, modulated/carried with FFT size of 64 on a 20 MHz channel and may be included as part of the first part of the HE frame 400. In one or more implementations, a TX signal processing unit 280 (or an IFT 284) illustrated in FIG. 3A may carry out the modulation described in this paragraph as well as the modulations described in other paragraphs above. In one or more implementations, an RX signal processing unit 290 (or an FT 292) may perform demodulation for a receiver.

Each of the fields (e.g., L-LTF, HE-SIG-B, etc.) of the HE frame 400 includes one or more guard intervals and one or more OFDM symbols. The guard interval may be utilized to facilitate compensation of multi-path effects, which may cause inter-symbol interference (ISI). In one or more implementations, a guard interval is a cyclic prefix (CP), and a guard interval duration is a CP length. In one or more aspects, the term duration may be referred to as a length. A guard interval associated with the first part of the HE frame may be predetermined to be, and set to, for example, 0.8 μs. In one aspect, a guard interval for each of a legacy OFDM symbol in the legacy header in the first part is set to, for example, 0.8 μs. In one aspect, no guard interval is used for symbols in the L-STF field. Each guard interval may be associated with a symbol and may be present between symbols (or between consecutive symbols). In some aspects, each OFDM symbol is preceded (or followed) by a guard interval. In some aspects, the OFDM symbol may be referred to as including the guard interval that precedes (or follows) the OFDM symbol.

In one aspect, multiple guard intervals may be represented as one long guard interval, and such long guard interval may precede (or follow) the OFDM symbols associated with the multiple guard intervals. For example, a guard interval of 1.6 μs (representing two guard intervals, each being 0.8 μs) may be prepended to two consecutive OFDM symbols associated with the two guard intervals.

In one or more implementations of a transmitter, a GI inserter 285 illustrated in FIG. 3A may prepend a guard interval to an OFDM symbol. For a receiver, a GI remover 291 of FIG. 3B may remove the prepended guard interval.

In one aspect, the term "OFDM symbol duration" or "symbol duration" may refer to a duration of the OFDM symbol itself, excluding any guard interval duration associated with the OFDM symbol. In another aspect, the term "OFDM symbol duration" or "symbol duration" may refer to the sum of a duration of an OFDM symbol and a duration of a guard interval associated with the OFDM symbol, rather than simply the duration of the OFDM symbol itself, e.g., without the duration of the guard interval.

The table below provides examples of characteristics associated with the various components of the HE frame 400.

| Element | Definition | Duration | DFT period | GI | Subcarrier spacing | Description |
|---|---|---|---|---|---|---|
| L-STF | Non-HT Short Training field | 8 μs | — | — | equivalent to 1,250 kHz | HE-STF of a non-trigger-based PPDU has a periodicity of 0.8 μs with 10 periods. |
| L-LTF | Non-HT Long Training field | 8 μs | 3.2 μs | 1.6 μs | 312.5 kHz | |

| Element | Definition | Duration | DFT period | GI | Subcarrier spacing | Description |
|---|---|---|---|---|---|---|
| L-SIG | Non-HT SIGNAL field | 4 μs | 3.2 μs | 0.8 μs | 312.5 kHz | |
| RL-SIG | Repeated Non-HT SIGNAL field | 4 μs | 3.2 μs | 0.8 μs | 312.5 kHz | |
| HE-SIG-A | HE SIGNAL A field | $N_{HESIGA}$ * 4 μs | 3.2 μs | 0.8 μs | 312.5 kHz | HE-SIG-A is duplicated on each 20 MHz after the legacy preamble to indicate common control information. $N_{HESIGA}$ means the number of OFDM symbols of HE-SIG-A field and is equal to 2 or 4. |
| HE-SIG-B | HE SIGNAL B field | $N_{HESIGB}$ * 4 μs | 3.2 μs | 0.8 μs | 312.5 kHz | $N_{HESIGB}$ means the number of OFDM symbols of HE-SIG-B field and is variable. DL MU packet contains HE-SIG-B. SU packets and UL Trigger based packets do not contain HE-SIG-B. |
| HE-STF | HE Short Training field | 4 or 8 μs | — | — | non-trigger-based PPDU: equivalent to 1,250 kHz; trigger-based PPDU: equivalent to 625 kHz | HE-STF of a non-trigger-based PPDU has a periodicity of 0.8 μs with 5 periods. (A non-trigger-based PPDU is not sent in response to a trigger frame) The HE-STF of a trigger-based PPDU has a periodicity of 1.6 μs with 5 periods. (A trigger-based PPDU is an UL PPDU sent in response to a trigger frame) |
| HE-LTF | HE Long Training field | $N_{HELTF}$ * (DTF period + GI) μs | 2xLTF: 6.4 μs 4xLTF: 12.8 μs | supports 0.8, 1.6, 3.2 μs | 2xLTF: equivalent to 156.25 kHz; 4xLTF: 78.125 kHz | HE PPDU shall support 2xLTF mode and 4xLTF mode. In the 2xLTF mode, HE-LTF symbol excluding GI is equivalent to modulating every other tone in an OFDM symbol of 12.8 μs excluding GI, and then removing the second half of the OFDM symbol in time domain. $N_{HELTF}$ is equal to 1, 2, 4, 6, 8. |
| HE-DATA | HE DATA field | $N_{DATA}$ * (DTF period + GI) μs | 12.8 μs | supports 0.8, 1.6, 3.2 μs | 78.125 kHz | $N_{DATA}$ means the number of HE data symbols. |

HE-based transmission may support larger FFT sizes and longer GI durations, such as a GI duration of 1.6 μs. As shown, for example, in FIG. 4 and the table above, different symbols of the HE frame may include different GI durations, including longer GI durations such as 1.6 μs. Utilization of longer GI durations, such as the even longer GI (EGI) of 1.6 μs, may allow the HE-based transmission to cope with larger channel dispersion compared to what is possible in current IEEE 802.11 specifications (e.g., IEEE 802.11a, b, g, n, ac).

FIG. 5 illustrates an example of a beamforming procedure between a transmitter (Tx) node 502 and a receiver (Rx) node 504. The beamforming procedure may include a channel state information (CSI) sounding procedure 506 followed by one or more beamformed data exchange procedures. The Tx node 502 may be utilized to transmit one or more beamformed data packets to the Rx node 504. Thus, the Tx node 502 may be referred to as a beamformer whereas the Rx node 504 may be referred to as a beamformee. In some aspects, the Tx node 502 may be an access point, and the Rx node 504 may be a station. In other aspects, the Tx node 502 may be a station, and the Rx node 504 may be an access point.

Prior to transmission of a beamformed data packet, Tx node 502 may initiate the CSI sounding procedure 506 using a non-data packet announcement (NDPA) 510 followed by a non-data packet (NDP) 512. The NDPA 510 is utilized by the Tx node 502 to notify the Rx node 504 of an intent of the Tx node 502 to transmit a beamformed data packet. The NDPA 510 is generally immediately followed by the NDP 512. The non-data packet may also be referred to as a null data packet. The non-data packet announcement may also be referred to as a null data packet announcement.

In some aspects, the NDPA 510 and the NDP 512 may be the HE frame 400, except without the HE-DATA field or with an empty HE-DATA field. For example, the NDPA 510 and the NDP 512 may include only the header (e.g., the legacy and HE headers) of the HE frame 400. In one aspect, the time period between the transmission of the NDPA 510 and the transmission of the NDP 512 may be a short interface space (SIFS). The CSI sounding procedure 506 may be referred to as a sounding procedure, a channel sounding procedure, a channel measurement procedure, or a channel calibration procedure. In a case where NDPs are utilized in the CSI sounding procedure, the CSI sounding procedure 506 may also be referred to as an NDP sounding procedure.

The Rx node 504 may receive the NDP 512 and may transmit CSI feedback information 514 in response to the NDP 512. In one aspect, the time period between the transmission of the NDP 512 by the Tx node 502 and the transmission of the CSI feedback 514 by the Rx node 504 may be a SIFS. In some aspects, the Rx node 504 may allow explicit sounding. In explicit sounding, the Rx node 504 may utilize the NDP 512 to compute a feedback vector/matrix based on the NDP 512 and transmit the feedback matrix as the CSI feedback information 514 to the Tx node 502. The feedback matrix may be based on analysis of, for example, the training fields (e.g., L-STF, L-LTF, HE-STF, HE-LTF) contained in the NDP 512. For example, the Rx node 504 may perform measurements (e.g., power measurements) on the NDP 512 at various tones. The Tx node 502 may then utilize the feedback matrix to determine a beamforming vector/matrix to be utilized for transmission of beamformed data packets to the Rx node 504.

In some aspects, the Rx node 504 may allow implicit sounding. In implicit sounding, the RX node 504 may respond to the NDP 512 from the Tx node 502 with a frame that may allow the Tx node 502 to measure the channel. The frame is provided as the CSI feedback information 514 to the Tx node 502. In one aspect, the frame may be an NDP. The Tx node 502 may utilize the CSI feedback 514 to determine a beamforming vector/matrix to be utilized for transmission of beamformed data packets to the Rx node 504. In some aspects, the Tx node 502 may indicate (e.g., in the NDPA 510 and/or the NDP 512) what kind of feedback information the Rx node 504 should provide in the CSI feedback information 514 and/or in what format the feedback information should be provided.

The beamforming vector/matrix may be referred to as a beamforming matrix for simplicity. The beamforming matrix may also be referred to as a steering matrix or pre-coding matrix and may be represented as a Q matrix. In one aspect, the beamforming matrix may change from tone to tone.

After the CSI sounding procedure 506, one or more beamformed data exchange procedures may be performed between the Tx node 502 and the Rx node 504. In a beamformed data exchange procedure, the Tx node 502 may transmit a beamformed data packet 516 to the Rx node 504. The beamformed data packet 506 may include a beamformed portion that is generated (e.g., by a processor 210 or 211) based on the beamforming matrix determined during the CSI sounding procedure 506. The beamformed data packet 516 may be referred to as a beamformed HE PPDU packet. Upon successfully receiving the beamformed data packet 516, the Rx node 504 may transmit an acknowledgement (ACK) packet to the Tx node 502. In some aspects, the beamformed data packet 516 may have a format similar to the HE frame 400. In some aspects, the beamformed data packet 516 may have a format similar to a beamformed data packet 600 or 700, as will be discussed further below with respect to FIGS. 6 and 7, respectively.

Although one beamformed data exchange procedure between the Tx node 502 and the Rx node 504 is shown in FIG. 5, additional subsequent beamformed data exchange procedures may be performed between the Tx node 502 and the Rx node 504, as represented by the ellipses in FIG. 5. Furthermore, the beamforming procedure may be performed between the Tx node 502 and multiple receiver nodes. For example, the Tx node 502 may be an access point that initiates the beamforming procedure by transmitting an NDPA to multiple stations that are participating in MU transmission or MU communication (e.g., MIMO and/or OFDMA communication).

In one or more implementations, in OFDMA communication, the Tx node 502 may transmit a frame between the NDP 512 and the CSI feedback information 514. The frame may be referred to as a trigger frame. The frame may include resource allocation information for each receiver node (e.g., each STA) that is participating in OFDMA. For example, the resource allocation information may include the frequency bands over which each receiver node may transmit. Frequency bands may also be referred to as frequency regions. The frame may also provide instructions for the receiver nodes to transmit in a UL OFDMA manner. The CSI feedback information (e.g., 514) may be received by the Tx node 502 from the receiver nodes participating in the OFDMA substantially simultaneously. In one aspect, the Tx node 502 may represent an AP, and the RX node 504 may represent an STA. In another aspect, the Tx node 502 may represent an STA, and the RX node 504 may represent an AP.

FIG. 6 illustrates an example of an HE frame 600, which may represent the beamformed data packet 516 of FIG. 5. The frame 600 may include an omni-directional portion 602 and a beamformed portion 604. The omni-directional portion 602 may include an L-STF, an L-LTF, an L-SIG field, a repeated legacy signal field (R-L-SIG), a signal A field (e.g., HE-SIG-A), and a signal B field (e.g., HE-SIG-B). The beamformed portion 604 may include a beamformed HE-STF, a beamformed HE-LTF, and beamformed data (HE-DATA). The boundary between the omni-directional portion 602 and the beamformed portion 604 may be set at right before the HE-STF field. In some aspects, the various fields in the frame 600 may be the same as or similar to corresponding fields in the HE frame 400, with examples of differences described below. In some aspects, the omni-directional portion 602 coincides with the first part of the HE frame 400 and the beamformed portion 604 coincides with the second part of the HE frame 400. The R-L-SIG of FIG. 6 may be the same as the RL-SIG of FIG. 4.

The HE-STF may be used to perform automatic gain control at a receiver (e.g., the Rx node 504). In some aspects, the HE-STF may be 8 μs long or 16 μs long. For example, the HE-STF may be 8 μs long in case of downlink transmission and uplink single user transmission, and 16 μs long in case of uplink multi-user transmission. The HE-LTF may include $N_{LTF}$ symbols, where each symbol is either $M_4$ or $M_2$ μs long. The length of the HE-LTF symbol (e.g., either $M_4$ or $M_2$) depends on whether the compressed LTF mode or non-compressed LTF mode is used. $M_4$ is utilized in the non-compressed LTF mode, which may be referred to as a 4xLTF mode. $M_2$ is utilized in the compressed LTF mode, which may be referred to as a 2xLTF mode. In some aspects, $M_4$ is 12.8 μs plus the cyclic prefix (CP) length, and $M_2$ is 6.4 μs plus the CP length. The HE-SIG-A and/or the HE- SIG-B fields may contain an indication that the beamformed data packet 516 utilizes the non-compressed or the compressed LTF mode.

The HE-DATA symbols may include OFDM data symbols, each having a length of 12.8 μs, and respective guard intervals. In some cases, the guard intervals for the HE-LTF symbols and/or the HE-DATA symbols may be cyclic prefixes (CPs). An OFDM symbol having the length 12.8 μs may be generated by transforming frequency domain signals with 78.125 kHz subcarrier spacing into the time domain, using, for example, a processor 210 or 211. The transformation may include a Fourier transform, such as an FFT. The omni-directional portion 602 of the frame 600 may utilize frequency domain signals with 312.5 kHz subcarrier spacing.

The omni-directional portion 602, which is associated with substantially equal energy in all directions, may be utilized to allow other devices (e.g., stations) to detect that transmission between the Rx node 504 and the Tx node 502 is occurring. In contrast, the beamformed portion 604 may include higher energy in some directions and near zero energy in other directions, which may cause the other devices to not detect that transmission between the Rx node 504 and the Tx node 502 is occurring. The omni-directional portion 602 includes the preamble, which may contain an entire duration of an HE frame being transmitted (e.g., in the L-SIG field) as well as may contain an entire duration of a transmission opportunity (TXOP) (e.g., in the HE-SIG-A field or HE-SIG-B field). The other devices may detect at least the omni-directional portion 602 and determine the duration associated with the transmission between the Rx node 504 and the Tx node 502 by analyzing the omni-directional portion 602. The other devices may defer their communication with the Tx node 502 for a time duration based on information contained in the omni-directional portion 602.

Figure 7:
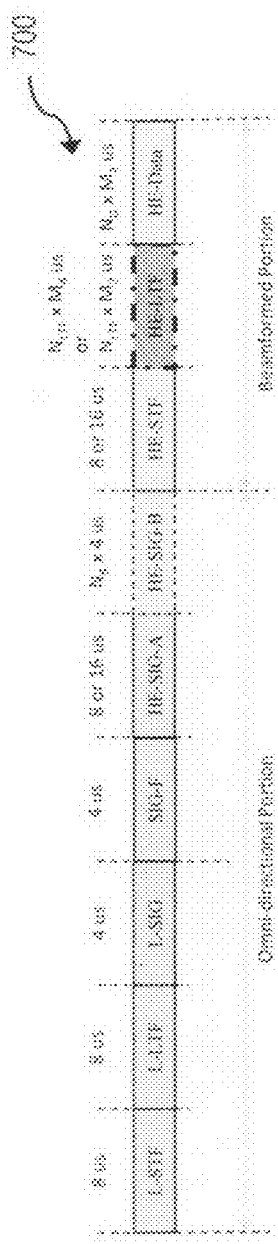
FIG. 7 illustrates an example of an HE frame.

FIG. 7 illustrates an example of an HE frame 700, which may represent the beamformed data packet 516 of FIG. 5. The frame 700 may include a special signal field (SIG-F) instead of an R-L-SIG after the L-SIG. The length of the SIG-F field may be 4 μs. The other fields in the frame 700 may be the same as or similar to corresponding fields in the HE frame 400 or 600.

Figure 8:
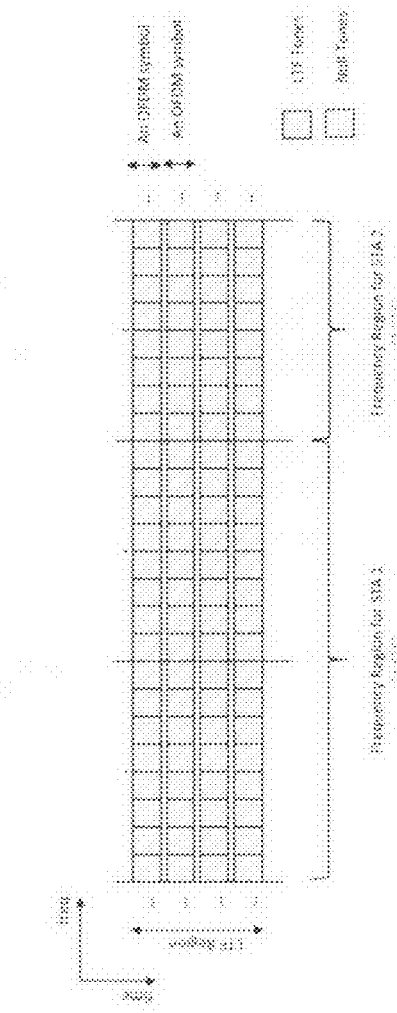
FIG. 8 illustrates an example of a time frequency mapping in a non-compressed long training field (LTF) mode for orthogonal frequency division multiple access (OFDMA) transmission.

FIG. 8 illustrates an example of a time frequency mapping in the non-compressed LTF mode for OFDMA transmission. Each of the two stations, STA1 and STA2, is allocated respective frequency band(s). In the non-compressed LTF mode, LTF sequences are sent in each usable subcarrier in each spatial stream. In one aspect, each LTF sequence is code-multiplexed, where the code is defined in the time domain. This effectively spreads the LTF sequence in the time domain using orthogonal codes. STA1 utilizes four space-time streams (STSs) and STA2 utilizes one STS. For each subcarrier of each STA, the number of HE-LTF symbols, represented as $N_{LTF}$, may be equal to the highest number of STSs utilized by the STAs. In FIG. 8, STA1 utilizes the highest number of STSs (e.g., four STSs) and, accordingly, STA1 and STA2 utilize four LTF symbols per subcarrier. In one aspect, space-time streams may be generated based on spatial streams.

Figure 9:
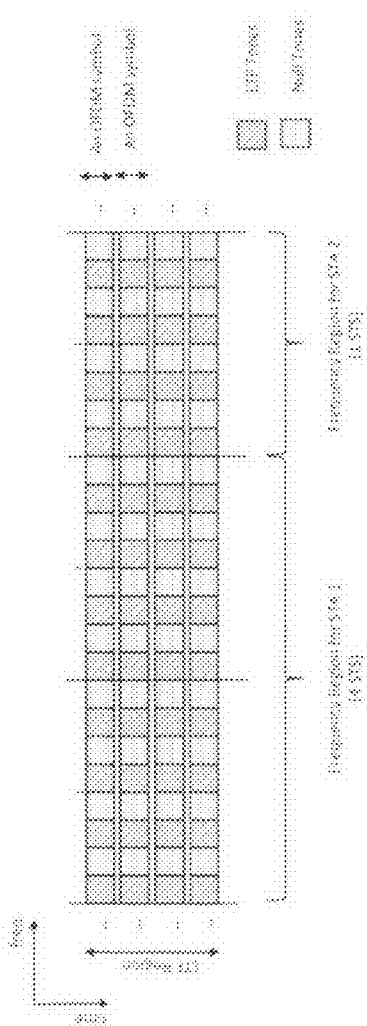
FIG. 9 illustrates an example of a time frequency mapping in a 2xLTF compressed LTF mode.

FIG. 9 illustrates an example of a time frequency mapping in a 2xLTF compressed LTF mode. In the 2xLTF compressed LTF mode, null tones are inserted in every other usable subcarrier in each LTF symbol. The inserting of a null tone in every other usable subcarrier in the frequency domain causes a duplication of the time domain samples in the time domain. In some aspects, the LTF sequences for different spatial streams may be code-spread in the time domain and interlaced in the frequency domain.

Figure 10:
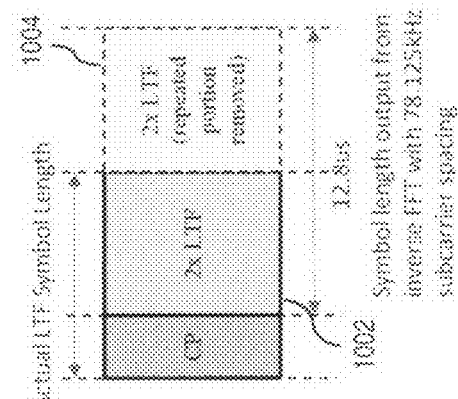
FIG. 10 illustrates an example of a removal of repeated time domain samples.

After transforming the frequency domain modulated sequences into the time domain, half of the time domain samples may be removed. FIG. 10 illustrates an example of a removal of repeated time domain samples 1004. The time domain samples 1004 are identical to time domain samples 1002. In one aspect, the Tx node 502 removes the time domain samples 1004, such that they are not transmitted by the Tx node 502. This can be equivalently implemented by use of inverse Fourier transform (e.g., IFFT) of 156.25 kHz subcarrier spacing instead of 78.125 kHz subcarrier spacing. The 156.25 kHz subcarrier spacing results in a symbol duration of 6.4 μs, which is exactly half of the non-compressed symbol duration for LTF of 12.8 μs.

Figure 11:
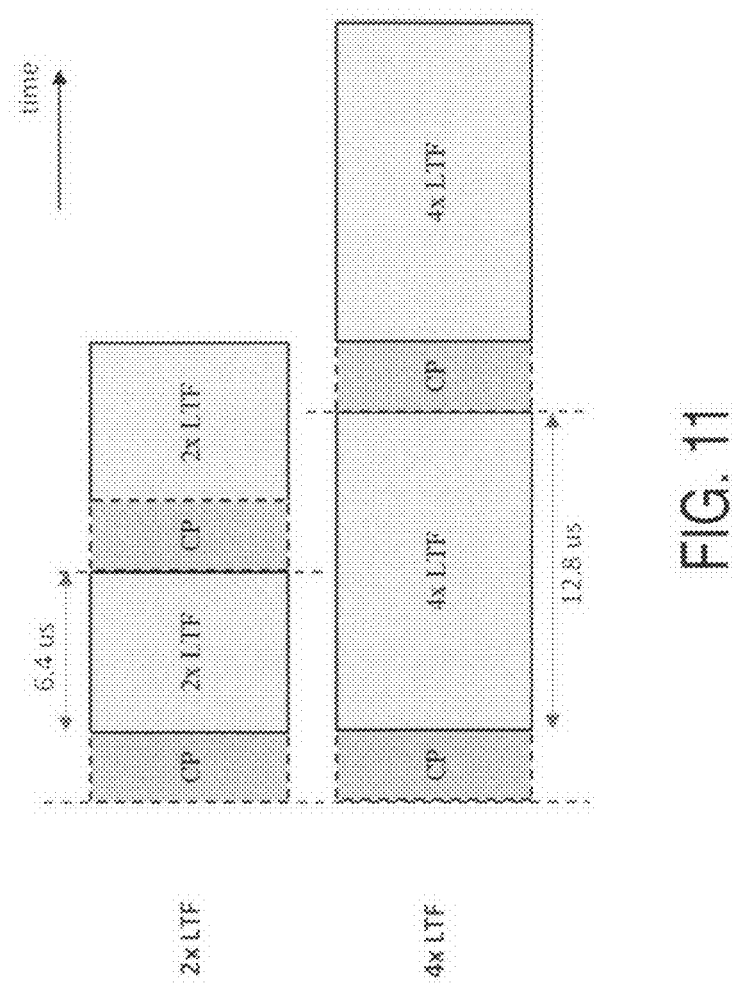
FIG. 11 illustrates a comparison of an HE-LTF length of two 2xLTF symbols and two non-compressed LTF symbols.

FIG. 11 illustrates a comparison of an HE-LTF length of two 2xLTF symbols and two non-compressed LTF symbols. Each of the symbols may be preceded by a respective CP. The utilization of the compressed LTF mode, such as the 2xLTF compressed LTF mode, may allow shortening of the length of the HE-LTF and therefore can save overhead incurred for transmitting data. In the non-compressed mode, the length of each HE-LTF symbol may be 12.8 μs excluding CP length. In the compressed mode, the length of each HE-LTF symbol may be 6.4 μs excluding CP length. With reference back to FIG. 5, upon receipt of the beamformed data packet 516 from the Tx node 502, the Rx node 504 may determine whether the HE-LTF of the beamformed data packet 516 utilizes the compressed LTF mode or non-compressed LTF mode. In the case that the beamformed data packet 516 utilizes non-compressed LTF mode, the Rx node 504 may perform channel coefficient estimation based on information of the beamformed data packet 516 received in each usable tone, since the information (e.g., HE-LTF) is sent for each of the usable tone to facilitate facilitates channel estimation of each usable tone.

In the case that the beamformed data packet 516 utilizes a compressed LTF mode, the Rx node 504 may duplicate the HE-LTF of the beamformed data packet 516 such that the HE-LTF symbols are of length 12.8 μs and then transform the length 12.8 μs HE-LTF symbols to the frequency domain. Since the data signals utilize 78.125 kHz subcarrier spacing, the Rx node 504 needs to obtain channel coefficients for all usable subcarriers being used for transmission of data signals. In the 2xLTF compressed mode, null tones are inserted in every other usable subcarrier. The subcarriers at which null tones are inserted do not contain any information. Since channel measurements cannot be made for the subcarriers associated with these null tones, the Rx node 504 (e.g., a processor 210 or 211) may perform interpolation or in certain cases extrapolation to estimate the channel coefficients for the subcarriers that do not contain any information. The performing of the channel coefficient estimation at the Rx node 504 depends on several factors, such as smoothness in a transfer function of the channel (e.g., flatness), beamforming vectors/matrices used by the Tx node 502, noise, etc.

The beamforming matrices utilized in transmitting beamformed data packets are chosen by the Tx node 502 (e.g., a processor 210 or 211). Because the Rx node 504 does not know the exact beamforming matrices used during transmission, beamforming can cause some uncertainty in performing interpolation to estimate channel coefficients for the null tones. For example, if the beamforming matrix is changed significantly between subcarriers, and the Rx node 504 does not information associated with the beamforming matrix, interpolation may not yield reliable results.

Figure 12:
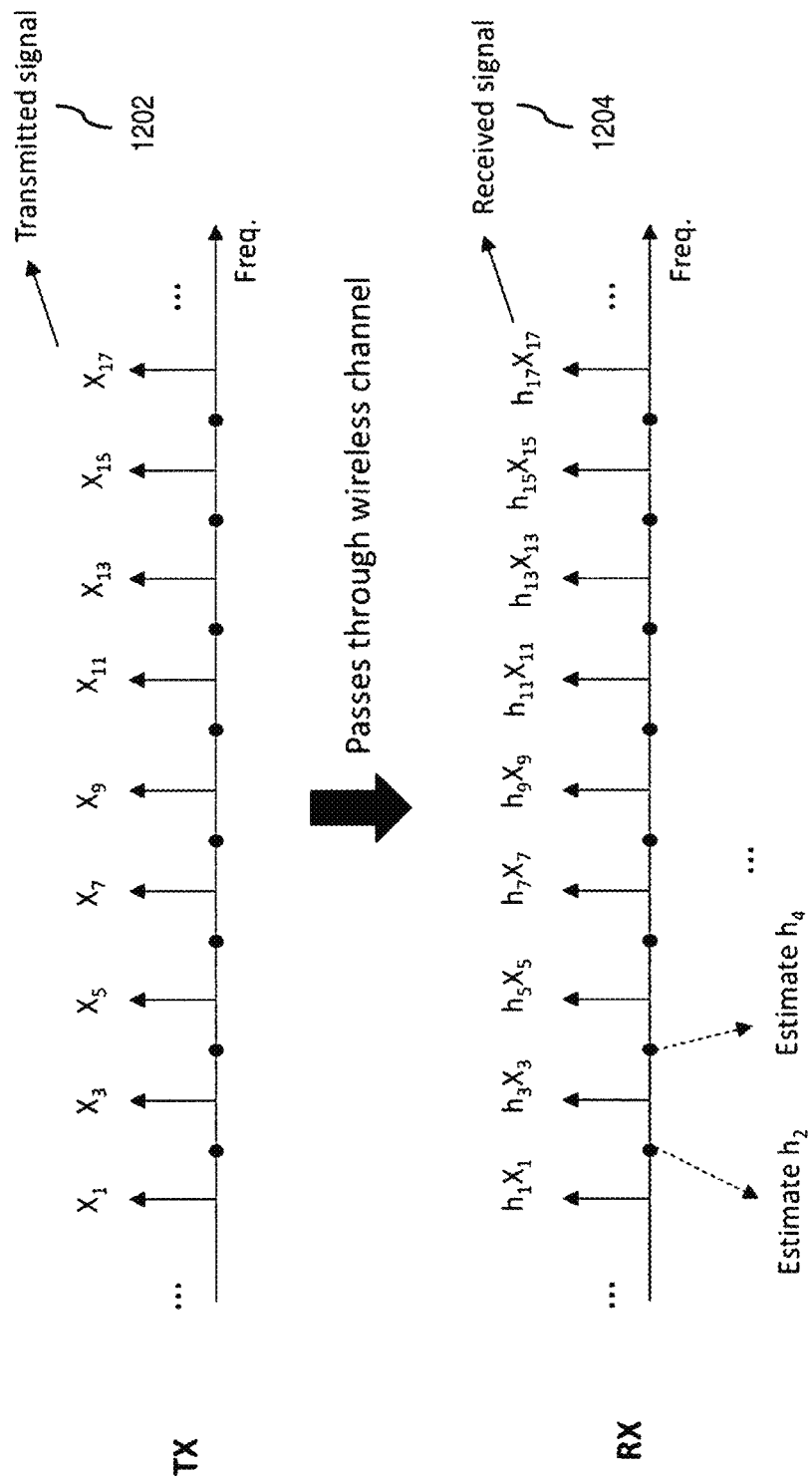
FIG. 12 illustrates examples of signals transmitted by a transmitter and signals received by a receiver.

FIG. 12 illustrates examples of signals 1202 transmitted by a transmitter (e.g., the Tx node 502) and signals 1204 received by a receiver (e.g., the Rx node 504). The signals 1202 are transmitted using a 2xLTF compression mode in which signals are transmitted in every other subcarrier. The horizontal dimension represents the frequency dimension. Upon transmission by the transmitter, the transmitted signals 1202 are modulated by the channel coefficients of a wireless channel while traversing through the wireless channel and are received by the receiver as the received signals 1204. The transmitted signals 1202 may be represented as $X_1$, $X_3$, $X_5$, ..., $X_{17}$, etc. whereas the received signals 1204 may be represented as $h_1X_1$, $h_3X_3$, $h_5X_5$, ..., $h_{17}X_{17}$, where 1, 3, 5, ..., 17, etc. represent subcarrier indices and $h_k$ represents a channel coefficient of the wireless channel associated with a subcarrier of index k, where k is an integer.

From the received signals 1204, the receiver may estimate the channel coefficients associated with subcarriers that do not contain transmitted signals (e.g., $h_2$, $h_4$, etc.). In some aspects, the transmitted signals 1202 include a training sequence (e.g., HE-LTF) already known to the receiver to allow the receiver to perform channel estimation. In the transmitted signals 1202, a training sequence is allocated to every other tone. In such a case, the receiver may be able to perform channel estimation to determine (e.g., estimate) channel coefficients $h_2$, $h_4$, etc., since the receiver knows the transmitted training sequence and uses knowledge that $h_1$ and $h_3$ are generally similar in value due to continuity of the wireless channel.

Figure 13:
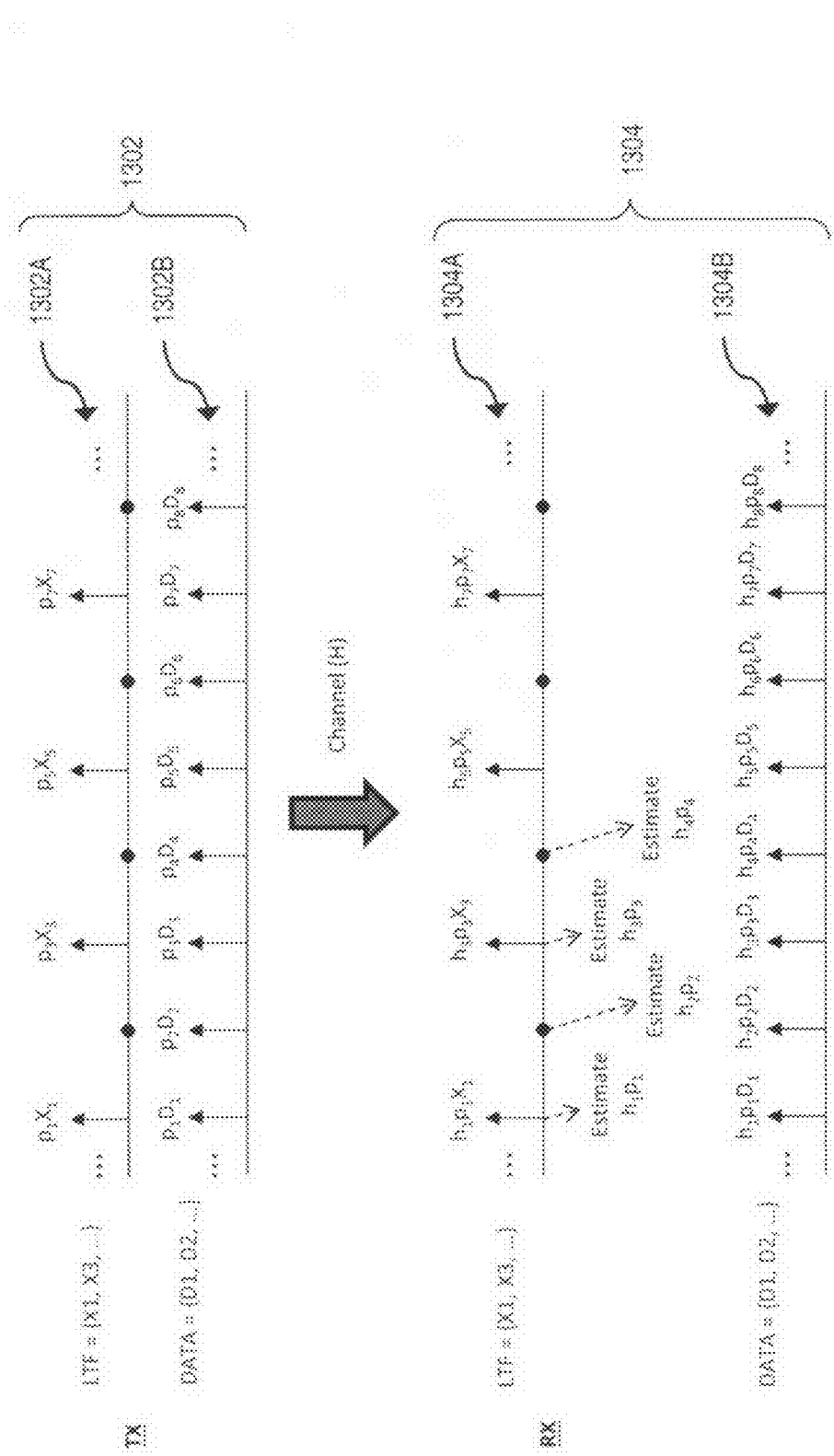
FIG. 13 illustrates examples of beamformed signals transmitted by a transmitter and beamformed signals received by a receiver.

Received signals may be very different when transmitted signals are beamformed. In some aspects, the transmitter may apply any beamforming on each subcarrier, and information associated with the beamforming is not conveyed to the receiver. FIG. 13 illustrates examples of beamformed signals 1302 transmitted by a transmitter (e.g., the Tx node 502) and beamformed signals 1304 received by a receiver (e.g., the Rx node 504). The horizontal dimension represents the frequency dimension. The beamformed signals 1302 may be, may include, or may be a part of, the beamformed portion 604 of FIG. 6. The beamformed signals 1302 are transmitted using a 2xLTF compression mode in which beamformed HE-LTF signals 1302A utilizes every other subcarrier, and beamformed data signals 1302B utilizes every subcarrier. The beamformed HE-LTF signals 1302A may be represented as $p_1X_1$, $p_3X_3$, $p_5X_5$, $p_7X_7$, etc. and the beamformed data signals 1302B may be represented as $p_1D_1$, $p_2D_2$, ..., $p_8D_8$, etc., where 1, 2, 3, ..., 8, etc. represent subcarrier indices and $p_k$ represents a beamforming matrix associated with the subcarrier of index k and applied to HE-LTF signal $X_k$ and data signal $D_k$, where k is an integer. For the beamformed HE-LTF signals 1302A, a training sequence may be allocated for every other tone (e.g., k=1, 3, 5, 7, etc.) and a beamforming matrix applied for these tones. For the beamformed data signals 1302B, a beamforming matrix is applied for every subcarrier (e.g., k=1, 2, ..., 8, etc.).

Upon transmission by the transmitter, the beamformed transmitted signals 1302 are modulated by the channel coefficients of the wireless channel while traversing through the wireless channel and are received by the receiver as the received signals 1304. The received signals 1304 may include beamformed received HE-LTF signals 1304A and beamformed received data signals 1304B. The beamformed received HE-LTF signals 1304A may be represented as $h_1p_1X_1$, $h_3p_3X_3$, $h_5p_5X_5$, $h_7p_7X_7$, etc. and the beamformed received data signals 1304B may be represented as $h_1p_1D_1$, $h_2p_2D_2$, ..., $h_8p_8D_8$, etc., where 1, 2, 3, ..., 8, etc. represent subcarrier indices, $h_k$ represents a channel coefficient of the wireless channel associated with a subcarrier of index k, and $p_k$ represents a beamforming matrix associated with the subcarrier of index k, where k is an integer.

Even though the receiver may know the sequence $X_1$ and $X_3$, and may know that $h_1$ and $h_3$ are similar in value due to continuity of the wireless channel, the receiver is generally unable to estimate $h_2p_2$ (e.g., based on $h_1p_1$ and/or $h_3p_3$), since the receiver does not have information on the beamforming matrix $p_2$. The value of $p_2$ may change the value of $h_2p_2$ significantly.

In one or more implementations, to facilitate channel coefficient estimation when in compressed LTF mode, the beamforming matrices utilized by the Tx node 502 may follow a pattern that is signaled to the Rx node 504 or otherwise known by the Rx node 504. For example, the pattern may allow channel coefficient estimation of subcarriers associated with null tones. In some aspects, the pattern may involve applying, by the Tx node 502, the same beamforming matrices to a group of subcarriers. The grouping of subcarriers may be applied for HE-LTF subcarriers of HE-LTF symbols and data subcarriers of data symbols. The size of each group of subcarriers may be an integer multiple of two tones. For example, the size of each group may be four tones. The subcarriers within each group may be consecutive subcarriers.

During the CSI sounding procedure, the Rx node 504 may generate and send feedback information (e.g., the CSI feedback information 514) for each group of subcarriers, rather than for each subcarrier. For example, if the beamforming matrix remains constant over each group of four subcarriers, the Rx node 504 may generate and send feedback information once every four subcarriers, rather than generate and send feedback information for each subcarrier. Thus, the grouping of subcarriers may allow a reduction of overhead for the Rx node 504 associated with sending feedback information (e.g., the CSI feedback information 514) to the Tx node 502 during the CSI sounding procedure.

If the beamforming matrices are constant among subcarriers, then the changes of channel coefficients between different subcarriers are generally due to the frequency selectivity of the channel itself and noise. Many 802.11 system deployments have small channel delay spread, resulting in smooth (or slowly changing) channels in frequency domain. The slowly changing transfer function of the channel helps allow the receiver to correctly estimate the channel coefficients even in the null tones. Therefore, it may be beneficial for the Rx node 504 to have some knowledge or understanding of how the beamforming matrices are applied by the Tx node 502.

The Rx node 504 may perform channel coefficient estimation based on knowledge of the grouping. In some aspects, the grouping may be signaled in a signal field (e.g., HE-SIG-A and/or the HE-SIG-B field) of the beamformed data packet 516. For example, the signal field may contain a number indicative of the number of subcarriers within each group of subcarriers. In some aspects, the grouping may be a predetermined grouping such that all UL and DL transmissions utilize a defined number of subcarriers within each group of subcarriers for the 2xLTF compressed LTF mode.

With reference to FIG. 13, upon receiving the signals 1304, the receiver may process the beamformed received HE-LTF signals 1304A and beamformed received data signals 1304B. Processing the beamformed received HE-LTF signals 1304A may include estimating the wireless channel (e.g., estimating channel coefficients associated with the wireless channel) based on values of the beamformed received HE-LTF signals 1304A. Processing the beamformed received data signals 1304B may include decoding the beamformed received data signals 1304B (e.g., to obtain data signals $D_1, D_2, \ldots, D_8$, etc.) based on the estimated channel.

The channel estimation may be based on knowledge of grouping of subcarriers. In a case that two consecutive subcarriers (e.g., k=1 and 2) utilize the same beamforming matrix, then the receiver may estimate $h_2 p_2$ based on $h_1 p_1$, since $p_1 = p_2$. Similarly, the receiver may estimate $h_4 p_4$ based on $h_3 p_3$, since $p_3 = p_4$. In a case that four (or more) consecutive subcarriers (e.g., k=1, 2, 3, 4, etc.) utilize the same beamforming matrix, then each of $h_2 p_2$ and $h_4 p_4$ may be determined based on at least one of $h_1 p_1$ or $h_3 p_3$, since $p_1 = p_2 = p_3 = p_4$. Similarly, each of $h_6 p_6$ and $h_8 p_8$ may be determined based on at least one of $h_5 p_5$ or $h_7 p_7$, since $p_5 = p_6 = p_7 = p_8$.

In one or more aspects, for the transmitted signals 1302 and the received signals 1304, each group of subcarriers utilizes its respective beamforming matrix. Hence, subcarriers within a given group utilize the same beamforming matrix. For example, in a group that includes a first subcarrier (k=1) and a second subcarrier (k=2), the beamforming matrix $p_1$ for the first subcarrier is the same as the beamforming matrix $p_2$ for the first subcarrier. However, in one aspect, it should be understood that the term "same" does not require that $p_1$ and $p_2$ must be exactly equal to each other, but rather they can be substantially the same or substantially equal. In one or more aspects, the terms substantially equal, substantially identical, same, and substantially the same may be used interchangeably. Due to manufacturing tolerance and/or other factors, when $p_1$ and $p_2$ (or elements of $p_1$ and elements of $p_2$) are substantially the same or substantially equal, they are considered to be the same. For example, values with a variation of plus or minus 10% or less (e.g., 1%, 5%, 10%) from a nominal value can be considered to be the same. For instance, when an element $p_{11}$ of $p_1$ is 1.00, and an element $p_{21}$ of $p_2$ is 1.01, $p_{11}$ and $p_{21}$ are substantially the same and they are thus considered to be the same. Accordingly, in one or more aspects, when each group of tones is associated with a respective steering matrix, the tones within a given group is associated with the same steering matrix (where the term "same" does not mean exactly the same matrix but rather substantially the same matrix, as explained above).

In some aspects, the same cyclic shift delay (CSD) phase shift may also be applied for each group of subcarriers. The cyclic shift delay may be referred to as cyclic shift diversity or cyclic shift. A value associated with the CSD may be referred to as a CSD value or a cyclic shift value. The insertion of CSD may help prevent unintentional beamforming. For example, the time domain waveform of the Data field of a VHT PPDU may be provided by:

$$r_{VHT-Data}^{(iSeg, iTX)}(t) = \frac{1}{\sqrt{N_{VHT-Data}^{Tone} N_{STS,total}}} \sum_{n=0}^{N_{SYM}-1} w_{T_{SYM}}(t - nT_{SYM}) \cdot$$

$$\sum_{k=-N_{SR}}^{N_{SR}} \sum_{u=0}^{N_{user}-1} \sum_{m=1}^{N_{STS,u}} \left( \left[ Q_k^{(iSeg)} \right]_{i_{TX},(M_u+m)} \gamma_{k,BW} \left( \tilde{D}_{k,m,n,BW}^{(iSeg,u)} + p_{n+4} P_n^k \right) \cdot$$

$$\exp(j2\pi k \Delta_F (t - nT_{SYM} - T_{GI,Data} - T_{CS,VHT}(M_u + m)))$$

where k represents a subcarrier, $Q_k^{(iseg)}$ is associated with the beamforming matrix, and $T_{CS,VHT}$ is a cyclic shift value. The equation includes a multiplication of data D, beamforming matrix Q, and a cyclic shift value. The HE-DATA field for the HE PPDU (e.g., the HE frame 400) may share a similar form as the equation above with respect to the multiplication of data D, beamforming matrix Q, and a cyclic shift value.

For each group of subcarriers, the Q matrix and the $T_{CS}$ may be kept the same. For example, when each group contains four consecutive subcarriers, k=1, 2, 3, and 4 may be associated with a CSD of $T_{CS}$ whereas k=5, 6, 7, and 8 may be associated with a CSD of 5 $T_{CS}$. Although the foregoing description regarding grouping of subcarriers is described with reference to the 2xLTF compressed mode, the grouping of subcarriers may also be applied in the case of the non-compressed mode. For example, the grouping of subcarriers may allow reduction of overhead for the Rx node 504 associated with sending feedback information (e.g., the CSI feedback information 514) to the Tx node 502 during the CSI sounding procedure.

In one or more implementations, a method is described for designing the non-legacy LTF portion of the PPDU format that can support DL OFDMA with various numbers of spatial streams per user (e.g., per station). The non-legacy LTF portion refers to any LTF aside from the L-LTF. In some aspects, the number of non-legacy LTF symbols may be constant (e.g., not a function of number of spatial streams). In other aspects, the number of non-legacy LTF symbols may vary depending on the number of spatial streams utilized by one or more users participating in OFDMA. Examples of such number of non-legacy LTF symbol may be 1, 2, 3, or more.

Since, in some aspects, the number of non-legacy LTF symbols does not necessarily increase with supported number of spatial streams, the pilot density per spatial stream may decrease as the number of spatial streams increases for a given frequency band in OFDMA. Thus, keeping a constant, or minimally changing, number of non-legacy LTF symbols for all stations may be feasible.

Figure 14:
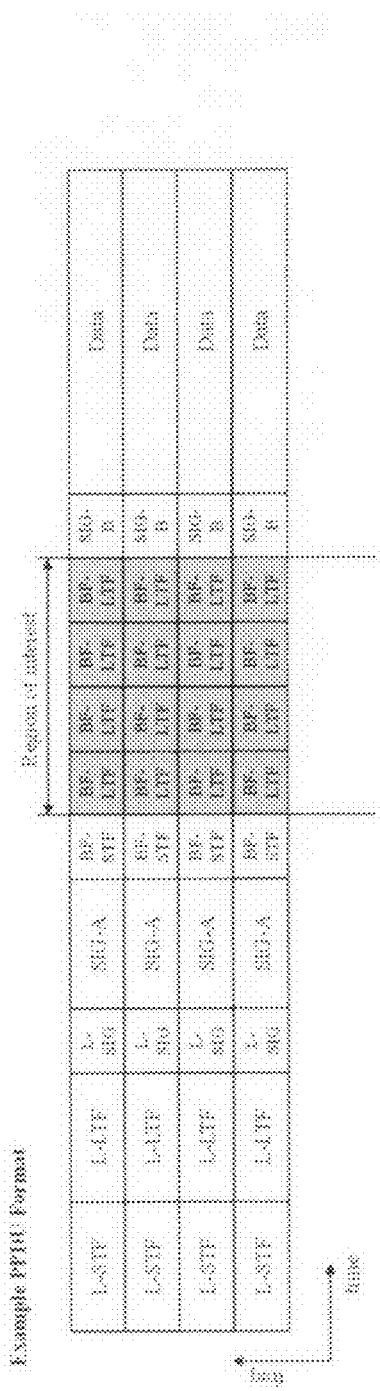
FIG. 14 illustrates an example of a very high throughput (VHT) physical layer convergence procedure (PLCP) protocol data unit (PPDU).

In PPDU formats such as very high throughput (VHT) PPDU, associated with IEEE 802.1ac based transmissions, or high throughput (HT) PPDU, associated with IEEE 802.11n based transmissions, the number of LTF OFDM symbol increases with increase in number of spatial streams of the data. For example, in VHT PPDU, four non-legacy LTF OFDM symbols are utilized when four spatial streams of data are transmitted. FIG. 14 illustrates an example of a VHT PPDU with four space-time streams (STS). The BF-STF and BF-LTF are the beamformed STF and LTF symbols for the VHT PPDU format.

Figure 15:
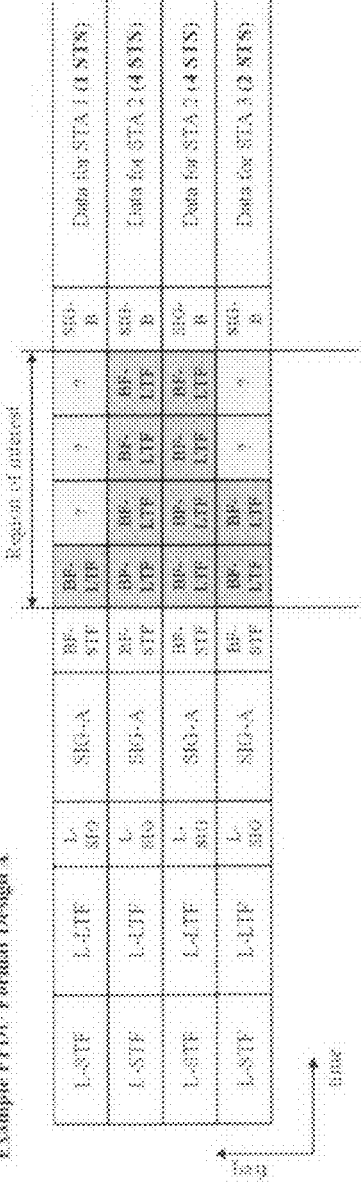
FIG. 15 illustrates an example of a PPDU format in which different receivers utilize a different number of spatial streams.

For a frame format in which OFDMA transmission is supported, the different receivers may receive and transmit data using a different number of spatial streams. FIG. 15 illustrates an example of a PPDU format in which different receivers (e.g., STAs) utilize a different number of spatial streams. STA1 utilizes one STS, STA2 utilizes eight STSs, and STA3 utilizes two STSs.

The situation in FIG. 15 was not an issue in VHT and HT transmissions because VHT PPDU or HT PPDU supports OFDM, where the receiver receives data signals over the entire transmitted bandwidth. Therefore, in VHT and HT, there was no need for support of different number of spatial streams for different frequency bands.

Figure 16:
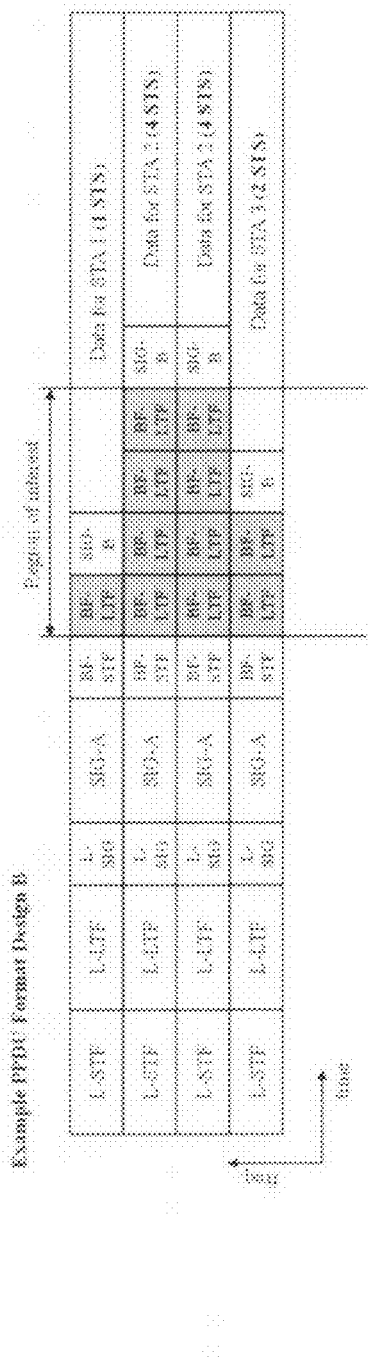
FIG. 16 illustrates an example of a PPDU format in which a different number of non-legacy LTF symbols is utilized in different frequency bands.

FIG. 16 illustrates an example of a PPDU format in which a different number of non-legacy LTF OFDM symbols is utilized in different frequency bands. The PPDU format may provide flexibly to adapt the number of LTF OFDM symbols for each allocated band when operating in OFDMA. Since the LTF sequences are generally designed such that peak to average power ratio (PAPR) is minimized, multiplexing LTF sequences with data or control signals (e.g., SIG-B) may destroy the low PAPR property of the LTF sequences. Furthermore, in the event that a guard interval (GI) length is different between the LTF (and/or SIG-B) OFDM symbols and the data symbols, OFDM symbol alignment is lost. With a lack of OFDM symbol alignment, the receiver may have difficulty correctly decoding received packets.

In one or more implementations, the LTF OFDM symbol alignment issue may be achieved by setting the number LTF OFDM symbol(s) to a constant value regardless of the number of transmitted STSs in OFDMA. This may be achieved by multiplexing pilots for varying number of STS in the same number of LTF OFDM symbols. The multiplexed pilots for different number of STS can be different in different frequency bands. For example, a portion of the frequency allocated to a user may multiplex four STSs and therefore four pilots for each STS may be mapped to the LTF OFDM symbol(s). Another portion of the frequency allocated to a user may multiplex two STSs and therefore two pilots for each STS may be mapped to the same LTF OFDM symbol(s).

Figure 17:
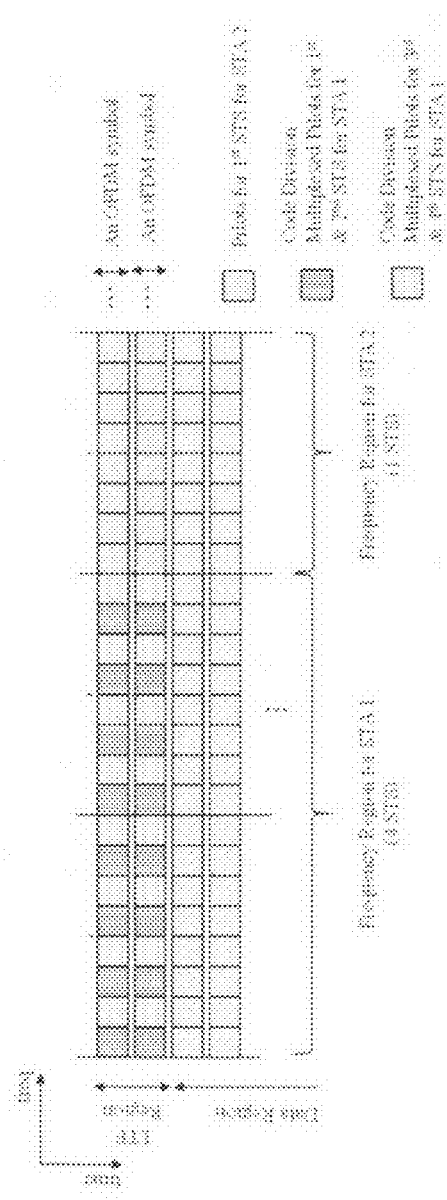
FIG. 17 illustrates an example of pilot mapping for multiple stations in OFDMA.

FIG. 17 illustrates an example of pilot mapping for multiple stations in OFDMA. The pilots are multiplexed for different number of STSs for the allocated bands of the stations in OFDMA. The number of LTF OFDM symbols is two regardless of the number of STSs. STA2, which is associated with one STS, has pilots for its STS. STA1, which is associated with four STSs, has code division multiplexed pilots for a first and a second STS as well as code division multiplexed pilots for a third and a fourth STS. In operating with a fixed number of LTF symbols, the pilot density per STS is lower as the number of STSs for data increases. In FIG. 17, STA1 is associated with a lower pilot density per STS than STA2. The fixed number of LTF symbols may also facilitate block-wise beamforming in the frequency domain. For example, beamforming may be performed such that interpolation and/or extrapolation of pilots is possible.

The rationale for being able to support a reduced pilot density in cases of higher number of spatial streams is that the signal-to-noise ratio (SNR) generally needed to support a high number of spatial streams is large. Therefore, channel estimation of pilots with a high number of spatial stream is favorable. Less dense pilots for a high number of spatial streams may be sufficient to satisfy the channel estimation quality needed to decode the data signal. In addition, in order to get sufficiently high SNR, the channel generally cannot be very frequency selective.

Since the number LTF OFDM symbols symbol(s) is fixed, the utilization of time multiplexing is possible but may be limited. Furthermore, pure time division multiplexing of pilots for each spatial stream may result in some of the spatial streams not transmitting power in certain OFDM symbols. Therefore, pilots for each spatial stream may be mapped such that the pilots contain signals in all the LTF OFDM symbol(s).

Figure 18:
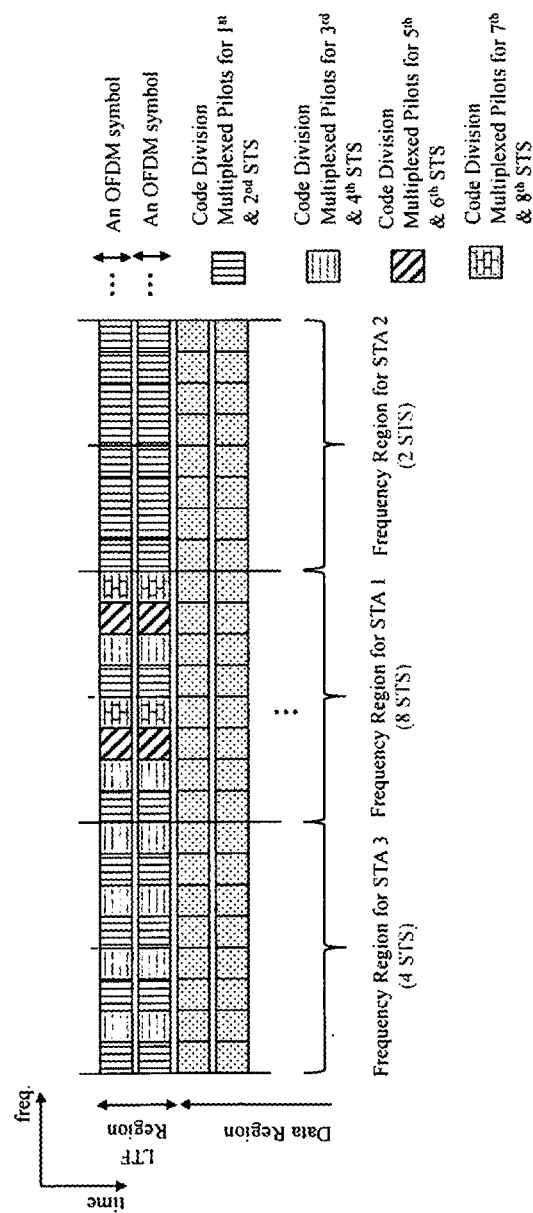
FIG. 18 illustrates an example of a pilot mapping for multiple stations in OFDMA.

FIG. 18 illustrates an example of a pilot mapping for multiple stations in OFDMA. STA1 utilizes eight STSs, STA2 utilizes two STSs, and STA3 utilizes four STSs. In FIG. 18, the number of non-legacy LTF OFDM symbols is fixed to two regardless of the number of STSs. If the number of STSs is 1 or 2, the pilots are multiplexed in both LTF OFDM symbols in all the subcarriers corresponding to the data for the STA, as shown for STA2. The pilots for STS 1 and 2 are code division multiplexed and share the same time/frequency resources. If the number of STSs is 3 or 4, the pilots for STS 1 and 2 are frequency division multiplexed and the pilots for STS 3 and 4 are frequency division multiplexed, as shown for STA3. Similar with STS 1 and 2, the pilots for STS 3 and 4 are code division multiplexed. Similarly, pilots of every odd and even pair of STS are code division multiplexed, and every two STSs are grouped and frequency division multiplexed among groups. The mapping of FIG. 18 can potentially have a different power spectrum density at the transmitter antenna in different subcarriers, as some subcarriers may have even number of pilots code division multiplexed and some may have only odd number of pilots mapped.

In some aspects, a block code multiplexing may be performed over both time and frequency. In such block code multiplexing, pilots for each STS may be mapped in all the time/frequency resources of the LTF OFDM symbol(s). One example of code division may utilize a two-dimensional code structure, where codes such as Walsh Hadamard codes may be used in the frequency domain, and existing time domain code from multiplexing pilots in HT PPDU or VHT PPDU may be used in the time domain.

In order for a receiver (e.g., any of STA1, STA2, or STA3 in FIG. 16) to perform accurate channel estimation of all the data subcarriers, the beamforming performed at the transmitter may have a set pattern. The set pattern may include grouping subcarriers such that subcarriers within the same group have the same beamforming matrix applied. For example, for a group frequency division multiplexing, such as shown in FIG. 18), the beamforming matrix used may be identical over the group of subcarriers. For example, if frequency division (or code division) multiplexing is used among groups of pilots, the beamforming matrix applied for the subcarriers within each group of subcarriers is identical. The use the same beamforming matrix for each group of subcarriers may allow continuity of the channel coefficients over the group of subcarriers such that the receiver may be able to perform accurate channel estimation. In some aspects, each group may include four subcarriers in the case of 7 or 8 STSs, three subcarriers in the case of 5 or 6 STSs, and two subcarriers in the case of 1 or 2 STSs. The subcarriers in each group may be consecutive subcarriers. In some aspects, the beamforming matrix for each subcarrier within a group of subcarriers may be substantially equal to each other. Other numbers of subcarriers may be included in each group of subcarriers. In some aspects, the CSD applied to the subcarriers within each group of subcarriers may be the same.

In some aspects, the number of subcarriers in each group of subcarriers for which the beamforming matrix is the same may vary depending on the number of STSs and may be tied to the frequency/code division multiplexed method. In other aspects, the number of subcarriers in each group of subcarriers for which the beamforming matrix is the same may be fixed for any number of supported STSs. For example, the number of subcarriers may be set to four subcarriers, regardless of the number of supported STSs.

Figures 19, 20:
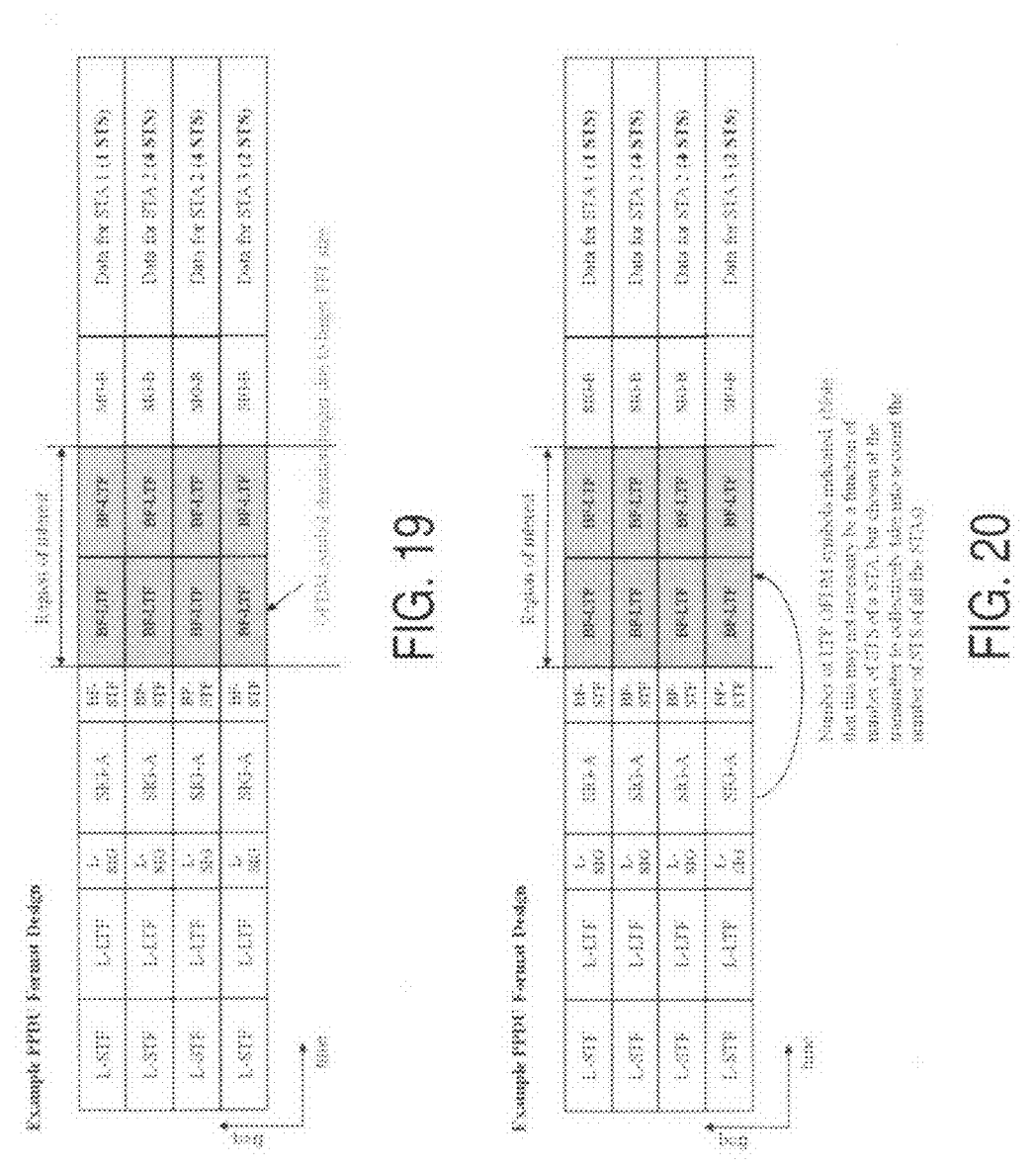

FIG. 19 illustrates an example of a PPDU format. The non-legacy LTF region is fixed regardless of number of STSs supported for each user, and are OFDM symbol aligned. Therefore, it may be possible to design specific sequences that achieve low PAPR, as only known sequences are multiplexed in the same OFDM symbol.

In some aspects, the number of non-legacy LTF OFDM symbols may be fixed to one. In such aspects, all the pilots for each STS may be either frequency or code division multiplexed over a group of subcarriers. In some aspects, the number of subcarriers within each group of subcarriers may be a function of number of data STSs in the same frequency allocation. In other aspects, the number of subcarriers within each group of subcarriers may be fixed regardless of number of data STSs.

In one or more implementations, a varying number of LTF OFDM symbols that is independent of the number of STSs may be utilized. In order to efficiently support up to 8 (or more) STSs, multiple LTF OFDM symbols (e.g., 2 or 3) may need to be supported. On the other hand, supporting only one STS may only require a single LTF OFDM symbol. In order to optimize for both conditions, control information may be utilized to indicate the number of LTF OFDM symbols, and depending on the number of LTF OFDM symbols the pilot mapping for various number of STS can be modified.

For example, the number of LTF OFDM symbols may be one or two OFDM symbols. In case all the receiving STAs have one STS, the number of LTF OFDM symbol may be indicated as 1, and the pilots may be mapped in all the frequency resources of the single LTF OFDM symbol. In case some (e.g., at least one) of the receiving STAs have more than two STSs, the number of LTF OFDM symbol may be indicated as 2, and pilot mappings such as those shown for example in FIGS. 17 and 18 may be utilized. This results in the receiving STAs that are only using one STS having two different pilot mapping (e.g., one pilot mapping that utilizes only one LTF OFDM symbol and another pilot mapping that utilizes 2 LTF OFDM symbols) as a function of the control information signaling.

FIG. 20 illustrates an example of a PPDU format. Each of the frequency bands may be associated with the same number of LTF OFDM symbols, with the number of LTF OFDM symbols being indicated by the SIG-A field. The number of LTF OFDM symbols may not necessarily be directly mapped to the number of STS being utilized by a STA. Instead, the transmitter may choose the number of LTF OFDM symbols based on the collective number of STSs being utilized by all the receiving STAs in OFDMA transmission.

Like reference numerals may designate like elements. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

Figure 21A:
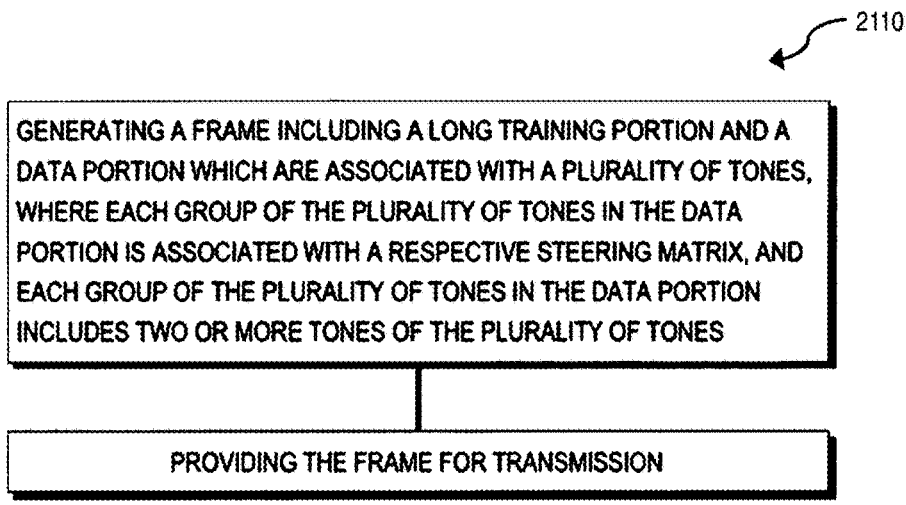
FIGS. 21A and 21B illustrate flow charts of examples of methods for facilitating wireless communication.
Figure 21B:
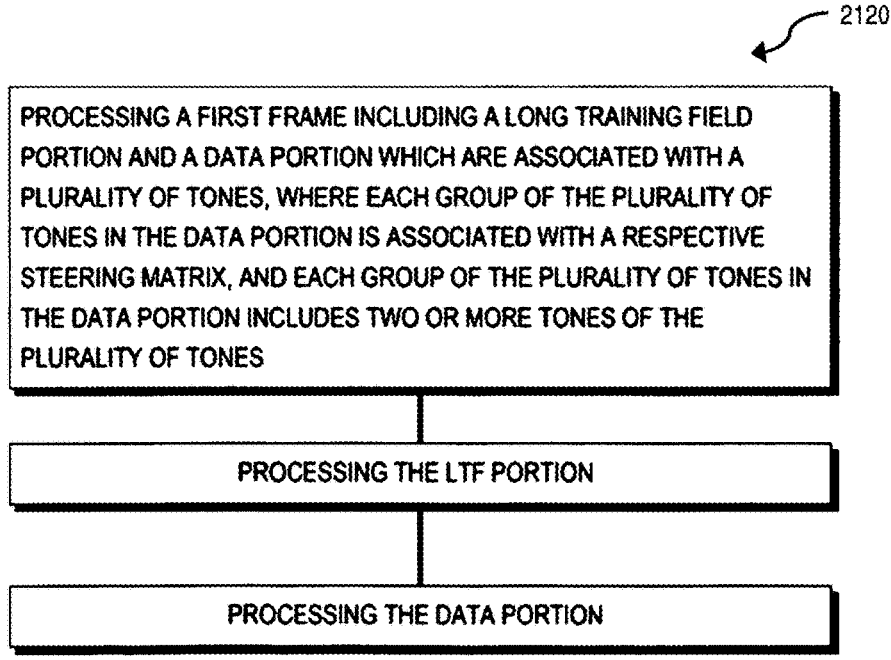

FIGS. 21A and 21B illustrate flow charts of examples of methods for facilitating wireless communication. For explanatory and illustration purposes, the example processes 2110 and 2120 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 2110 and 2120 are not limited to the wireless communication devices 111-115 of FIG. 1 or their components, and the example processes 2110 and 2120 may be performed by some of the devices shown in FIG. 1, or other devices or components. Further for explanatory and illustration purposes, the blocks of the example processes 2110 and 2120 are described herein as occurring in serial or linearly. However, multiple blocks of the example processes 2110 and 2120 may occur in parallel. In addition, the blocks of the example processes 2110 and 2120 need not be performed in the order shown and/or one or more of the blocks/actions of the example processes 2110 and 2120 need not be performed.

Various examples of aspects of the disclosure are described below as clauses for convenience. These are provided as examples, and do not limit the subject technology. As an example, some of the clauses described below are illustrated in FIGS. 21A and 21B.

Clause A. A method for a transmitting apparatus to transmit a frame, the method comprising: generating a frame, the frame comprising an LTF portion and a data portion which are associated with a plurality of tones, wherein each group of the plurality of tones in the data portion is associated with a respective steering matrix, and each group of the plurality of tones in the data portion comprises two or more tones of the plurality of tones; and providing the frame for transmission.

Clause B. A method for a receiving apparatus to receive a frame, the method comprising: receiving a frame, the frame comprising an LTF portion and a data portion which are associated with a plurality of tones, wherein each group of the plurality of tones in the data portion is associated with a respective steering matrix, and each group of the plurality of tones in the data portion comprises two or more tones of the plurality of tones; processing the LTF portion; and processing the data portion.

Clause C. A station for facilitating communication in a wireless network, the station comprising: one or more memories; and one or more processors coupled to the one or more memories, the one or more processors configured to cause: generating a frame, the frame comprising an LTF portion and a data portion which are associated with a plurality of tones, wherein each group of the plurality of tones in the data portion is associated with a respective steering matrix, and each group of the plurality of tones in the data portion comprises two or more tones of the plurality of tones; and providing the frame for transmission.

Clause D. A non-transitory computer-readable storage medium storing computer-executable instructions that, when executed by one or more processors, cause one or more processors to perform operations, the operations comprising: receiving a frame, the frame comprising an LTF portion and a data portion which are associated with a plurality of tones, wherein each group of the plurality of tones in the data portion is associated with a respective steering matrix, and each group of the plurality of tones in the data portion comprises two or more tones of the plurality of tones; processing the LTF portion; and processing the data portion.

Clause E. A computer-implemented method of facilitating wireless communication, the method comprising: generating a frame, the frame comprising an LTF portion and a data portion which are associated with a plurality of tones, wherein each group of the plurality of tones in the data portion is associated with a respective steering matrix, and each group of the plurality of tones in the data portion comprises two or more tones of the plurality of tones; and providing the frame for transmission.

In one or more aspects, additional clauses are described below.

A method comprising one or more methods or operations described herein.

An apparatus comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus comprising means (e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method for a transmitting apparatus to transmit a frame, the method comprising:
generating a frame, the frame comprising a long training field (LTF) portion and a data portion which are associated with a plurality of tones, wherein the plurality of tones in the data portion are grouped into a plurality of tone groups, wherein each tone group of the plurality of tones in the data portion comprises two or more consecutive tones of the plurality of tones, wherein a plurality of beamforming steering matrices are respectively applied to the plurality of tones, wherein at least two different beamforming steering matrices of the plurality of beamforming steering matrices are applied to different tone groups of the plurality of tone groups, wherein a same beamforming steering matrix is applied to each tone belonging to a same tone group, wherein the plurality of tone groups occupy different frequency areas; and
providing the frame for transmission.

2. The method of claim 1, wherein a training sequence is allocated to every other tone of the plurality of tones in the LTF portion for a spatial stream.

3. The method of claim 1, wherein the LTF portion is a compressed LTF portion.

4. The method of claim 1, wherein the two or more tones of the plurality of tones in the data portion comprise an integer multiple of two tones.

5. The method of claim 1, wherein each tone group of the plurality of tone groups in the data portion is associated with a respective cyclic shift value.

6. The method of claim 1, wherein the LTF portion comprises a first frequency region allocated for a first station and a second frequency region allocated for a second station.

7. The method of claim 6, wherein a number of space-time streams (STSs) associated with the first station is different from a number of STSs associated with the second station.

8. The method of claim 1, wherein an Orthogonal Frequency Division Multiplexing (OFDM) symbol of the LTF portion has a duration of 6.4 μs excluding any cyclic prefix (CP) duration.

9. The method of claim 1, wherein the frame further comprises an omni-directional portion.

10. The method of claim 9, wherein the omni-directional portion comprises legacy header fields, a repeated legacy signal (R-L-SIG) field, and one or more high efficiency signal (HE-SIG) fields.

11. The method of claim 1, wherein the frame comprises a beamformed portion, wherein the beamformed portion comprises a high efficiency short training field (HE-STF), an HE-LTF, and an HE data field, and wherein the HE-LTF is the LTF portion.

12. The method of claim 1, wherein tones in the LTF portion, except every other tone of the plurality of tones in the LTF portion, are null tones.

13. A method for a receiving apparatus to receive a frame, the method comprising:
receiving a frame, the frame comprising a long training field (LTF) portion and a data portion which are associated with a plurality of tones, wherein the plurality of tones in the data portion are grouped into a plurality of tone groups, wherein each tone group of the plurality of tones in the data portion comprises two or more consecutive tones of the plurality of tones, wherein a plurality of beamforming steering matrices are respectively applied to the plurality of tones, wherein at least two different beamforming steering matrices of the plurality of beamforming steering matrices are applied to different tone groups of the plurality of tone groups, wherein a same beamforming steering matrix is applied to each tone belonging to a same tone group, wherein the plurality of tone groups occupy different frequency areas;
processing the LTF portion; and
processing the data portion.

14. The method of claim 13, wherein a training sequence is allocated to every other tone of the plurality of tones in the LTF portion for a spatial stream.

15. The method of claim 13, wherein the LTF portion is a compressed LTF portion.

16. The method of claim 13, wherein the two or more tones of the plurality of tones in the data portion comprise an integer multiple of two tones.

17. The method of claim 13, wherein each tone group of the plurality of tones in the data portion is associated with a respective cyclic shift value.

18. The method of claim 13, wherein processing the LTF portion comprises estimating a channel based on the LTF portion, and processing the data portion comprises decoding data based on the estimated channel.

* * * * *